(12) United States Patent
Watanabe et al.

(10) Patent No.: US 12,539,651 B2
(45) Date of Patent: Feb. 3, 2026

(54) DEVICE AND METHOD FOR MANUFACTURING METAL-RESIN COMPOSITE

(71) Applicant: KOBE STEEL, LTD., Hyogo (JP)

(72) Inventors: Kenichi Watanabe, Kobe (JP); Hiroko Kashima, Kobe (JP); Shu Sekiguchi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 301 days.

(21) Appl. No.: 18/326,469

(22) Filed: May 31, 2023

(65) Prior Publication Data

US 2024/0025089 A1    Jan. 25, 2024

(30) Foreign Application Priority Data

Jul. 21, 2022    (JP) .................... 2022-116670

(51) Int. Cl.
| | |
|---|---|
| *B29C 43/18* | (2006.01) |
| *B29C 43/36* | (2006.01) |
| *B29C 70/78* | (2006.01) |
| *B29C 70/88* | (2006.01) |
| *B29L 31/30* | (2006.01) |
| *B29K 705/02* | (2006.01) |

(52) U.S. Cl.
CPC .............. *B29C 43/18* (2013.01); *B29C 43/36* (2013.01); *B29C 70/78* (2013.01); *B29C 70/885* (2013.01); *B29K 2705/02* (2013.01); *B29L 2031/3002* (2013.01)

(58) Field of Classification Search
CPC ......... B29C 43/18; B29C 43/36; B29C 70/78; B29C 70/885; B29L 2031/3002; B29K 2705/02

See application file for complete search history.

(56) References Cited

U.S. PATENT DOCUMENTS

| | | |
|---|---|---|
| 2018/0272630 A1 | 9/2018 | Kondo et al. |
| 2022/0258391 A1* | 8/2022 | Oda ............... B29C 45/14065 |

FOREIGN PATENT DOCUMENTS

| | | |
|---|---|---|
| DE | 28 30 247 A1 | 1/1979 |
| DE | 10 2018 106 709 A1 | 9/2018 |
| GB | 2000719 A | 1/1979 |
| JP | 2017-119422 A | 7/2017 |
| JP | 2020-104411 A | 7/2020 |
| JP | 2021-091140 A | 6/2021 |
| JP | 2021091139 A * | 6/2021 |

\* cited by examiner

*Primary Examiner* — Jerzi H Moreno Hernandez

(74) *Attorney, Agent, or Firm* — Studebaker Brackett PLLC

(57) ABSTRACT

A method for manufacturing a metal-resin composite includes preparing a mold including a first mold forming a housing portion and a second mold movable with respect to the first mold, housing an extruded material in the housing portion, arranging resin material on the first mold, moving the second mold to form a cavity defined by the extruded material and the mold, and filling the cavity with the resin material. In the filling, a protrusion of the extruded material is brought into close contact with the housing portion or its peripheral edge by molding pressure applied from the mold to the extruded material, and the cavity is disconnected from a gap between an inner surface of the housing portion and the extruded material.

16 Claims, 33 Drawing Sheets

DEVICE AND METHOD FOR MANUFACTURING METAL-RESIN COMPOSITE

CROSS-REFERENCE TO RELATED APPLICATION

This application claims priority of Japanese Patent Application No. 2022-116670 filed on Jul. 21, 2022, the contents of which are incorporated herein by reference.

BACKGROUND OF INVENTION

Technical Field

The present invention relates to a device and a method for manufacturing a metal-resin composite.

Related Art

Various structures and manufacturing methods have been proposed for a metal-resin composite applied to structural components such as a vehicle frame. For example, in a composite disclosed in JP 2017-119422 A, thermosetting carbon fiber-reinforced resin (CFRP) is bonded to a surface of an aluminum extruded material with an adhesive. In a composite disclosed in JP 2020-104411 A, CFRP is hot-pressed on an aluminum plate to integrate the aluminum plate and CFRP.

SUMMARY OF INVENTION

In a case where hot pressing exemplified in JP 2020-104411 A is applied to manufacturing of a composite containing an aluminum extruded material, it is considered that it is necessary to prepare a mold so as to form a suitable gap between the mold and the aluminum extruded material assumed to have reference dimension, in consideration of tolerance of the aluminum extruded material. By the above, the aluminum extruded material molded within the tolerance can be appropriately installed in the mold each time one composite is manufactured. On the other hand, the aluminum extruded material is hot-extruded as taught in JP 2017-119422 A. For this reason, twisting and bending are likely to occur during extrusion, and it is difficult to improve dimensional accuracy of the aluminum extruded material.

In view of low dimensional accuracy of the aluminum extruded material, it is considered that said gap between the mold and the aluminum extruded material needs to be considerably larger than a gap between mating surfaces of the mold. Then, a resin material unintentionally flows into the gap between the mold and the aluminum extruded material during hot pressing, by which manufacturing efficiency of the composite is lowered. For example, when the resin material is solidified in the gap, mold release resistance increases. After mold releasing, complicated work of peeling off an unnecessary resin material solidified in the gap occurs. In order to avoid shortage of the resin material on the aluminum extruded material, it is necessary to provide an extra amount of the resin material in advance in anticipation of a peeled amount.

An object of the present invention is to prevent flowing of a resin material into a gap between a mold and an extruded material, in manufacturing a metal-resin composite by press-molding the resin material on the extruded material.

A first aspect of the present invention provides a method for manufacturing a metal-resin composite in which a resin material is integrated with an extruded material made from metal by press molding. The method includes preparing a mold including a first mold forming a housing portion that accommodates at least a part of the extruded material and a second mold movable, in an opening and closing direction, with respect to the first mold, accommodating the extruded material in the housing portion and disposing the resin material on the first mold, and moving the second mold in a mold closing direction to form a cavity defined by a surface of the extruded material and the mold, and filling the cavity with the resin material by pressurizing the resin material with the resin material. The extruded material has a protrusion protruding from the surface and approaching the housing portion in an accommodation state where the extruded material is accommodated in the housing portion, and in the filling, the protrusion is brought into close contact with the housing portion or a peripheral edge portion of the housing portion by molding pressure applied from the mold to the extruded material, and the cavity is disconnected from a gap between an inner surface of the housing portion and the surface of the extruded material.

According to the above configuration, the protrusion provided on the extruded material is brought into close contact with the mold using molding pressure applied to the extruded material at the time of formation of the cavity, so that the cavity is disconnected from the gap between a surface of the extruded material and an inner surface of the housing portion. For this reason, it is possible to prevent the resin material from unintentionally flowing into the gap between the extruded material and the mold from the cavity.

In the filling, the molding pressure may be applied to the extruded material via the resin material.

According to the above configuration, the cavity can be disconnected from the gap using pressure applied from the resin material to the extruded material.

The extruded material may have a pair of flanges extending along the inner surface of the housing portion in the accommodation state, a pair of the protrusions may be provided on the pair of flanges, a pair of the flanges may form an inner space between inner surfaces of the flanges, and the inner space may constitute a part of the cavity, and in the filling, the molding pressure may be applied to a pair of the flanges via the resin material that has flowed into the inner space, a pair of the flanges may be deformed toward the inner surface of the housing portion, and the protrusion may be brought into close contact with the housing portion or the peripheral portion of the housing portion.

According to the above configuration, by allowing the resin material to flow into a pair of the flanges, a structure in which the extruded material is deformed using pressure of the resin material is realized. When the resin material filled in the inner space is integrated with the extruded material, a contact area of the resin material with the extruded material is enlarged, and the resin material is more firmly joined to the extruded material.

The protrusion may be provided on an outer surface of the flange, and in the filling with the resin material, the protrusion may come into close contact with the inner surface of the housing portion.

According to the above configuration, the resin material applies pressure in a plate thickness direction of the flange. Since the protrusion comes into close contact with the housing portion along the direction of the pressure, it is easy to eliminate the gap.

The extruded material may have an inner inclined surface provided on at least one of tip portions of a pair of the flanges, and the inner inclined surface is inclined so as to be separated from the housing portion toward a base end side of a pair of the flanges in the accommodation state.

According to the above configuration, when the resin material flows into the inner space, if the resin material acts on an inner inclined surface in a mold closing direction, the inner inclined surface is pressed in a direction of approaching the housing portion by an action of a wedge. By the above, the flange is further easily deformed toward the housing portion, and the gap is easily closed.

The extruded material may have a protruding portion that is provided on at least one of tip portions of a pair of the flanges and protrudes to the inner space side farther than an inner surface of the flange, and the inner inclined surface is formed on the protruding portion.

According to the above configuration, the resin material is caulked at the protruding portion, and joining strength of the resin material to the extruded material is improved.

The extruded material may have a pair of outer inclined surfaces that are provided on a lower surface side of at least one of a pair of the protrusions and inclined so as to be separated from the housing portion in an accommodating direction of the extruded material into the housing portion in the accommodation state, and in the accommodation of the extruded material, the flange may be deformed to the inner space side due to interference of the outer inclined surface with the housing portion, and the protrusion may come into close contact with the inner surface of the housing portion by an elastic force of the flange.

According to the above configuration, it is possible to accommodate the extruded material while the flange is deformed to the inner side by an action of a wedge of the outer inclined surface. The protrusion can be brought into close contact with the housing portion by also using a reaction force due to elastic deformation of the flange, and the gap can be more reliably closed.

The extruded material may have a protruding piece protruding from at least one of tip portions of a pair of the flanges to outside of the flange and exposed from the housing portion in the accommodation state, the protrusion may be provided at a tip portion of the protruding piece, and in the filling with the resin material, the protrusion may be brought into close contact with the peripheral edge portion of the housing portion.

According to the above configuration, since the gap is closed outside the housing portion, an undesirable inflow amount of the resin material can be reduced.

The protruding piece may have a pressure receiving surface perpendicular to the opening and closing direction of the mold in the accommodation state, and the protrusion may be provided at a tip portion of the protruding piece and face the peripheral edge portion in the opening and closing direction.

According to the above configuration, the protruding piece is pressed against a peripheral edge portion of the housing portion not only by deformation of the flange but also by molding pressure acting on the protruding piece itself. For this reason, contactness of the protrusion is improved, and the gap can be closed more reliably.

The mold may further include a third mold that is movable, in the opening and closing direction of the mold, with respect to the first mold and forms the housing portion together with the first mold, and the protrusion may protrude in the opening and closing direction in the accommodation state, and the third mold may come into contact with the protrusion so that the molding pressure is applied to the extruded material from the third mold.

According to the above configuration, since the third mold movable in the opening and closing direction also forms the housing portion, even if a cross-sectional shape of the extruded material is complicated, installation of the extruded material in the mold and release of the extruded material can be easily performed. In this case, molding pressure of the third mold is directly applied to the protrusion. By the above, surface pressure is locally generated in the protrusion, and the protrusion is brought into close contact with the housing portion. For this reason, it is easy to close the gap.

A pair of the protrusions may be provided on both sides in the opening and closing direction of the extruded material, one of the protrusions may disconnect a portion formed by the extruded material and the first mold of the gap from the cavity, and another one of the protrusions may disconnect a portion formed by the extruded material and the third mold of the gap from the cavity.

According to the above configuration, both the gap of the first mold and the gap of the second mold can be closed using molding pressure from the third mold.

The one of the protrusions may protrude in a direction approaching the first mold with respect to a surface installed on the first mold of the extruded material.

According to the above configuration, one of the protrusions can be easily brought into close contact with the first mold using molding pressure from the third mold, and the gap can be more reliably closed.

The another one of the protrusions may be provided in a step portion provided in a hook shape on the extruded material, and the third mold may come into contact with the another one of the protrusions so that the molding pressure is applied from the third mold to the another one of the protrusions.

According to the above configuration, by deforming the hook-shaped step portion using the molding pressure from the third mold, another one of the protrusions can be brought into close contact with the third mold. Therefore, the gap can be closed more reliably.

A second aspect of the present invention provides a device for manufacturing a metal-resin composite in which a resin material is integrated with an extruded material made from metal by press molding. The device includes a first mold that forms a housing portion that partially accommodates the extruded material and a second mold movable with respect to the first mold, and a moving mechanism that moves the second mold. The extruded material has a protrusion protruding from a surface of the extruded material and approaching the housing portion in an accommodation state where the extruded material is accommodated in the housing portion, and when the second mold is moved by the moving mechanism in a state where the resin material is disposed on the first mold, a cavity defined by a surface of the extruded material and the mold is formed, the resin material is pressurized to fill the cavity, the protrusion is brought into close contact with the housing portion or a peripheral edge of the housing portion by molding pressure applied from the mold to the extruded material, and the cavity is disconnected from a gap between an inner surface of the housing portion and the surface of the extruded material.

According to the present invention, flowing of a resin material into a gap between a mold and an extruded material can be prevented in manufacturing a metal-resin composite by press-molding the resin material on the extruded material.

DESCRIPTION OF EMBODIMENTS

Figure 1A:
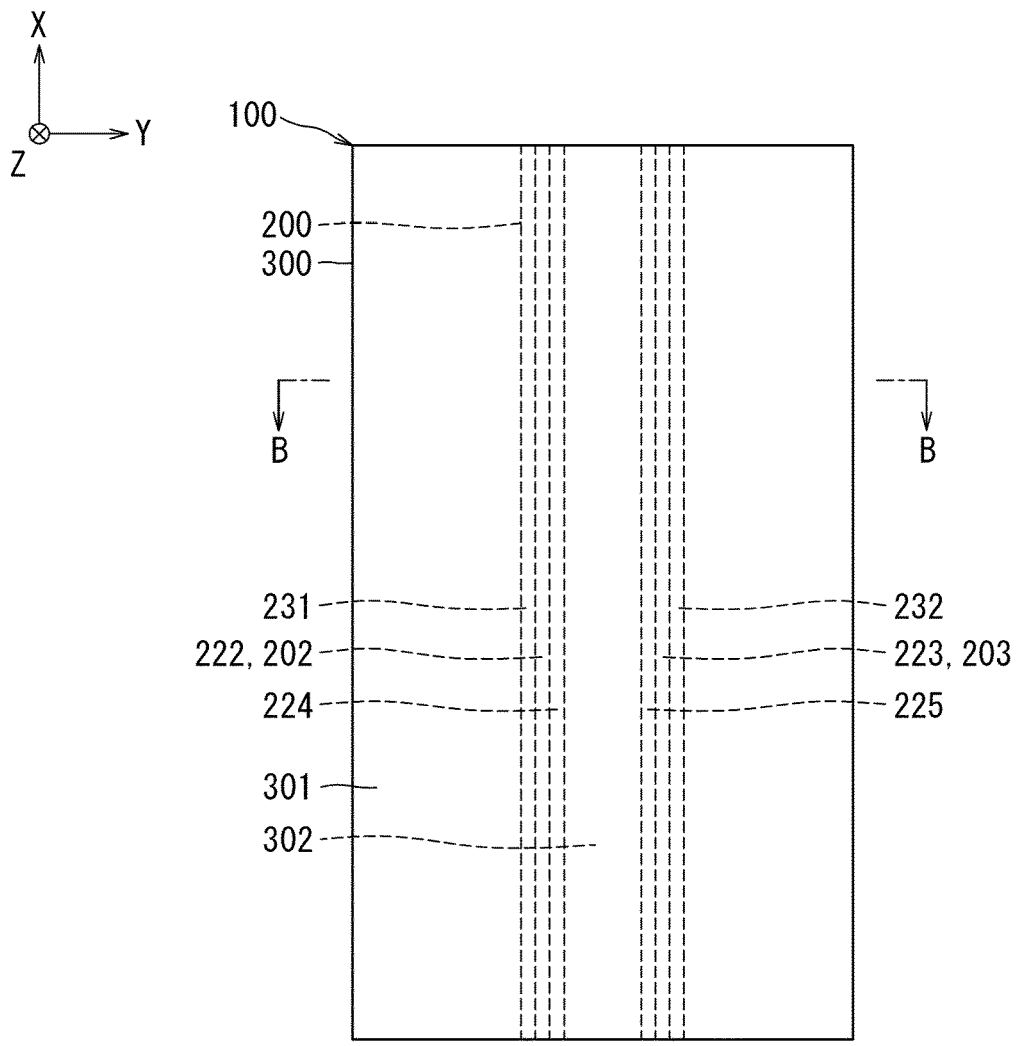
FIG. 1A is a plan view of a metal-resin composite manufactured by a manufacturing device and method according to a first embodiment of the present invention.

Embodiments of the present invention will be described with reference to the drawings. The same or corresponding elements are denoted by the same reference numerals throughout the drawings, and duplicate description will be omitted.

Figure 2A:
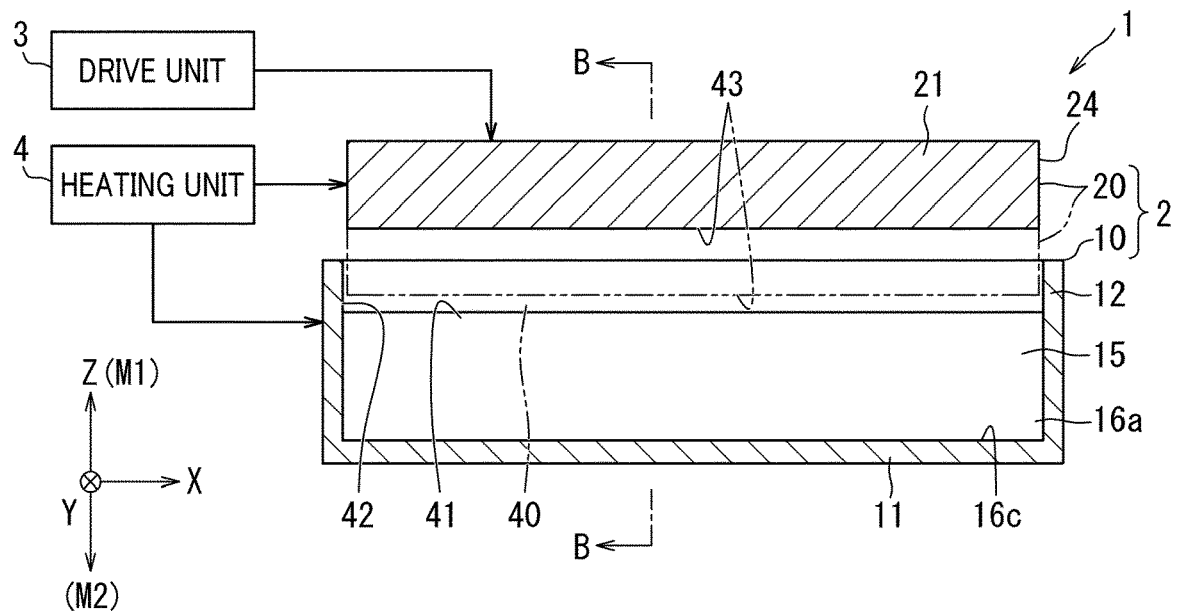
FIG. 2A is a cross-sectional view of the manufacturing device according to the first embodiment.

In a manufacturing device 1 and a manufacturing method of a metal-resin composite 100, a resin material 300 is integrated with an extruded material 200 made from metal by press molding using a mold 2 (see FIGS. 1A and 2A). An X direction in the diagram corresponds to an extrusion direction or a longitudinal direction of the extruded material 200. The term "cross section" simply refers to a cross section orthogonal to the X direction. A Y direction is one direction in a cross section, and corresponds to a width direction of the extruded material 200. A Z direction is orthogonal to the Y direction in a cross section, corresponds to a height direction of the extruded material 200, and also corresponds to an opening and closing direction of the mold 2. Since the Z direction is directed upward and downward in some diagrams, the Z direction is defined as vertical and the XY directions are defined as horizontal for convenience of description. The upper side (+Z direction) corresponds to a mold opening direction M1, and the lower side (−Z direction) corresponds to a mold closing direction M2. However, this is an example, and postures of the metal-resin composite 100 and a constituent element of the metal-resin composite 100 and the manufacturing device 1 and a constituent element of the manufacturing device 1 can be appropriately changed.

First Embodiment

Figure 1B:
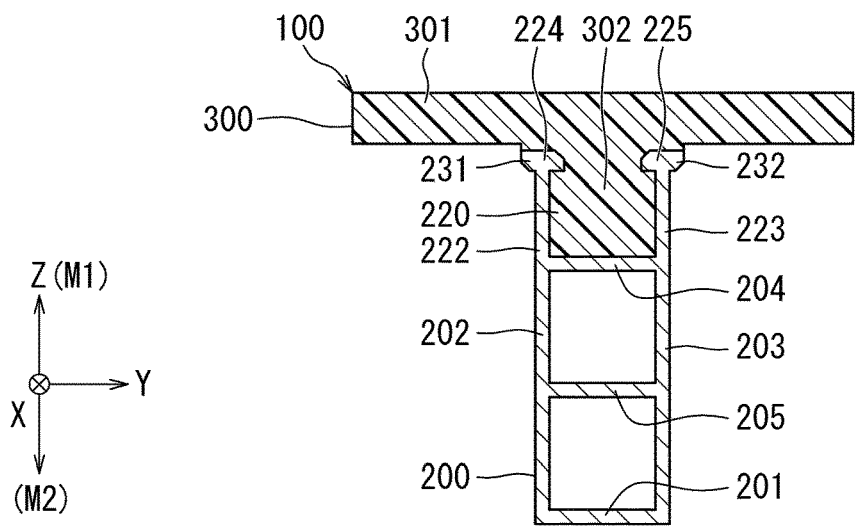
FIG. 1B is a cross-sectional view taken along line B-B in FIG. 1A.

Referring to FIGS. 1A and 1B, the metal-resin composite 100 according to a first embodiment includes the extruded material 200 made from metal and the resin material 300 provided on the extruded material 200. The metal-resin composite 100 is suitably applied to a structural component such as a vehicle body frame of an automobile.

A metal material of the extruded material 200 is not particularly limited. Light alloys such as an aluminum alloy and a magnesium alloy are preferable examples of the metal material, and contribute to both weight reduction and high rigidity of a structural component. Hereinafter, as a mere example, the extruded material 200 is made from an aluminum alloy.

Although not illustrated in detail, the extruded material 200 is obtained by heating and compressing a billet-shaped metal material in a main body of an extruder and extruding the billet-shaped metal material from a die attached to the main body. After extrusion from the die, required processing such as cooling, take-up, and cutting is executed. Since a cross section of the extruded material 200 is defined by a shape of the die, it is uniform in the longitudinal direction X. However, twisting or bending occurs due to hot molding. Elements of the extruded material 200 extend in the longitudinal direction X and are seamlessly integrated with one another.

Figure 2B:
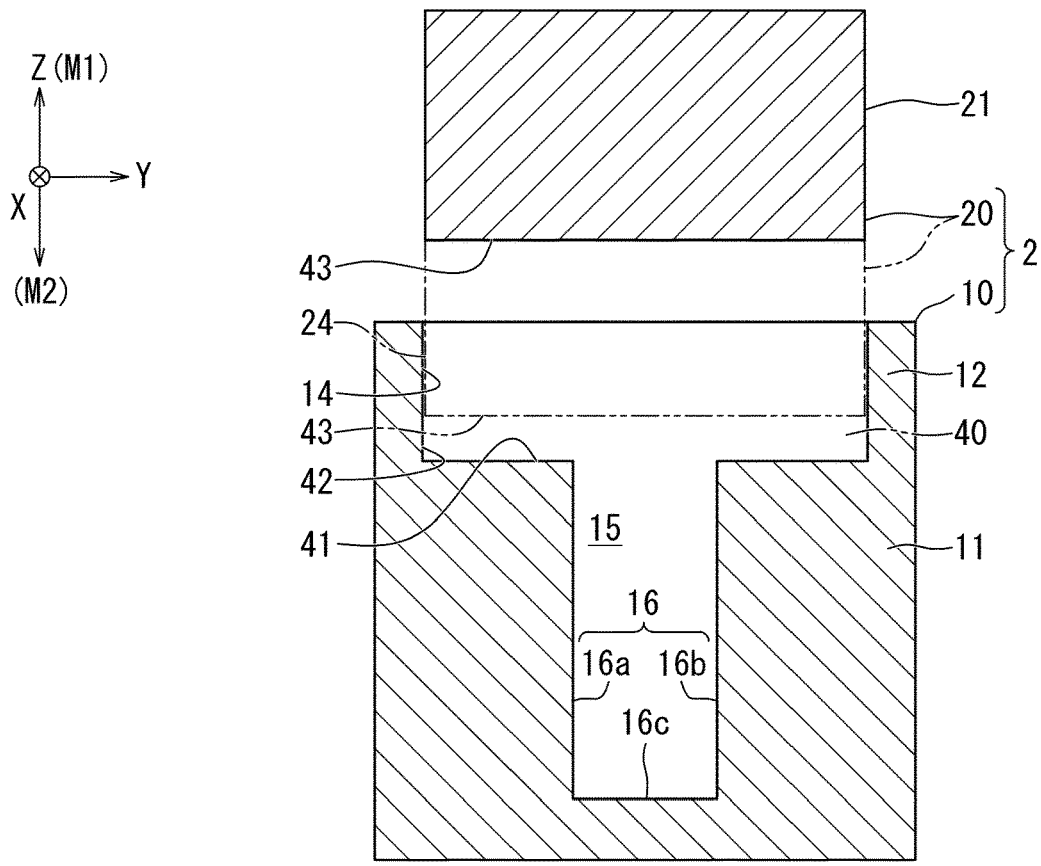
FIG. 2B is a cross-sectional view taken along line B-B in FIG. 2A.

The resin material 300 is obtained by press-molding a compound in the manufacturing device 1 (see FIGS. 2A and 2B). The compound may be a sheet molding compound (SMC) formed in a sheet shape or a bulk molding compound (BMC) formed in a lump shape. SMC or BMC is realized by fiber reinforced plastic (FRP) in which matrix resin is impregnated with a fiber. The matrix resin contains thermosetting resin such as unsaturated polyester as a main component, and an additive is mixed into the main component. The additive includes, for example, a mold release agent. The fiber is, for example, a glass fiber or a carbon fiber, which is cut short and oriented in a random direction in the compound. However, the resin material 300 is not limited to thermosetting resin, and may be thermoplastic resin. Hereinafter, as a mere example, the resin material 300 is made from SMC.

In the present embodiment, the extruded material 200 has a rectangular cross section. A long side of the rectangle extends in the height direction Z, and a short side extends in the width direction Y. The resin material 300 is provided on an upper portion of the extruded material 200 and is molded in a plate shape having a width larger than that of the extruded material 200. A cross section of the metal-resin composite 100 is formed in a T shape and is line-symmetric with respect to a center line in the width direction. Cross sections of the extruded material 200 and the resin material 300 are similarly line-symmetric.

Note that a plan view shape of the resin material 300 is not particularly limited. Here, as a mere example, the plan view shape is a rectangular shape in which a long side extends in the longitudinal direction X and a short side extends in the width direction Y, the short side of the resin material 300 is aligned with both ends in the longitudinal direction X of the extruded material 200, and a cross section of the metal-resin composite 100 is uniform in the longitudinal direction X.

Referring to FIGS. 2A and 2B, the manufacturing device 1 mainly includes the mold 2, a drive unit 3, and a heating unit 4. The mold 2 includes a first mold 10 and a second mold 20. The first mold 10 is configured as a fixed mold, a lower mold, or a die. The second mold 20 is configured as a movable mold, an upper mold, or a punch. The second mold 20 is disposed above the first mold 10 (that is, the mold opening direction M1) and is movable in the vertical direction (that is, the opening and closing direction) with respect to the first mold 10.

The first mold 10 has a base portion 11 and a shoulder portion 12. An upper surface of the base portion 11 forms a horizontal lower molding surface 41. The shoulder portion 12 protrudes upward from a peripheral edge portion of the base portion 11, and an inner surface of the shoulder portion 12 extends upward from the lower molding surface 41. The inner surface of the shoulder portion 12 is equivalent to the plan view shape of the resin material 300 of the metal-resin composite 100 in a cross section (not illustrated in detail) perpendicular to the opening and closing direction. In the present example, since the plan view shape of the resin material 300 is a rectangular shape (see FIG. 1A), the shoulder portion 12 has a rectangular window frame shape in a plan view as can be seen from FIGS. 2A and 2B. A lower portion of the inner surface of the shoulder portion 12 forms a vertical side molding surface 42. An upper portion of the inner surface of the shoulder portion 12 forms a lower mating surface 14.

The first mold 10 has a housing portion 15 that houses the extruded material 200. The housing portion 15 is provided as a recess in the lower molding surface 41. The housing portion 15 has a U-shaped inner surface 16 and is configured as a groove opened to the lower molding surface 41. The inner surface 16 of the housing portion 15 includes a pair of inner side surfaces 16a and 16b extending downward continuously with the lower molding surface 41, and an inner bottom surface 16c horizontally connecting the inner side surfaces 16a and 16b.

The second mold 20 has a main body portion 21. The main body portion 21 has a rectangular parallelepiped shape as an example. A lower surface of the main body portion 21 forms an upper molding surface 43 facing the lower molding surface 41 in the opening and closing direction. A side surface of the main body portion 21 forms an upper mating surface 24 extending upward from a peripheral edge of the lower molding surface 41. The upper mating surface 24 is similar to and slightly smaller than a cross section of the inner surface of the shoulder portion 12 in a cross section (not illustrated in detail) perpendicular to the opening and closing direction. For convenience, this interval is exaggerated in the diagram.

The drive unit 3 moves the second mold 20 in the opening and closing direction between a retracted position (see a solid line) and a bottom dead center (see a two-dot chain line). The heating unit 4 heats the mold 2.

Hereinafter, a method for manufacturing the metal-resin composite 100 (see FIG. 1A) using the manufacturing device 1 will be described. In addition, structures of the mold 2, the extruded material 200, the resin material 300, and the metal-resin composite 100 will be further described.

Figure 3:
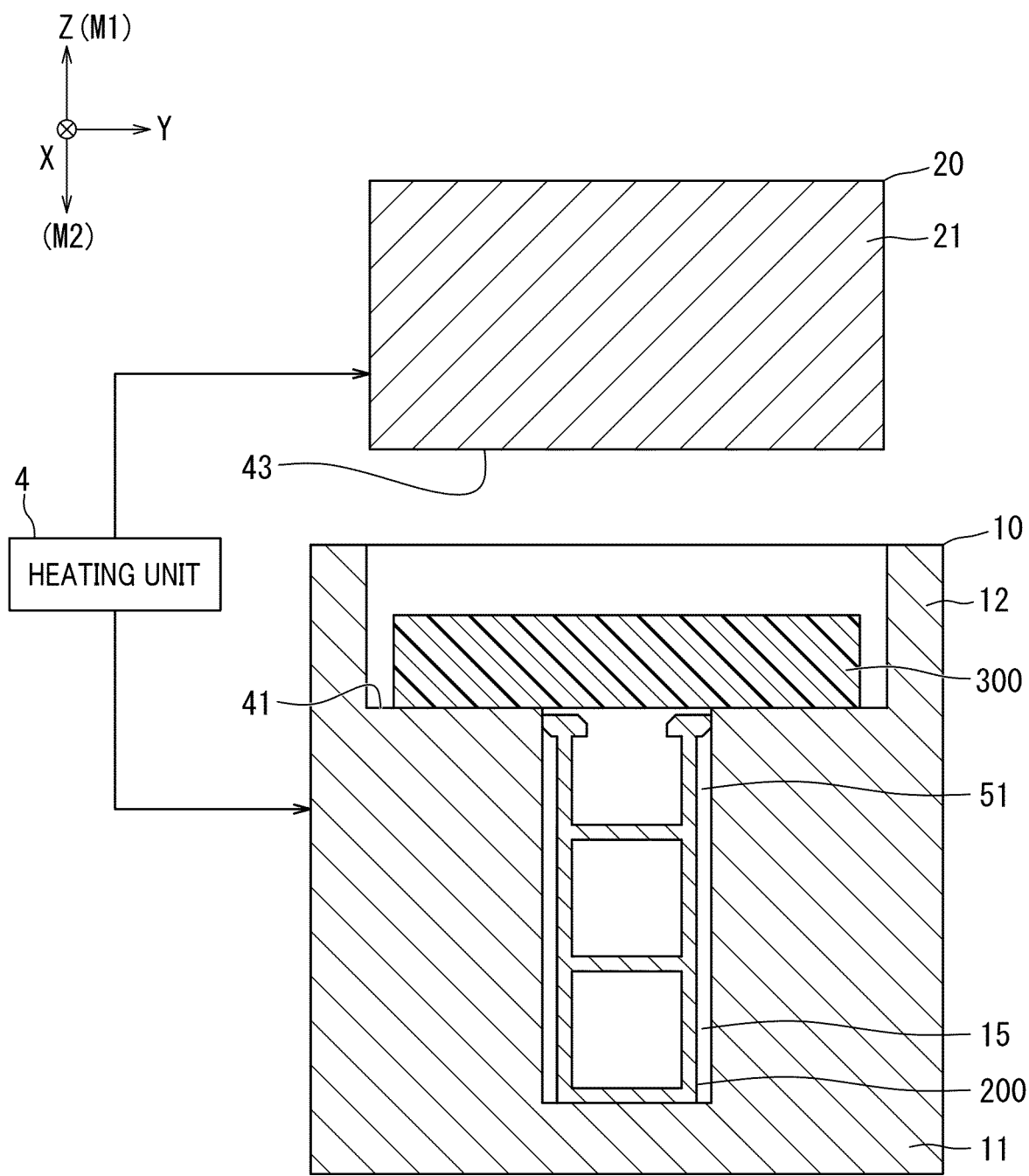
FIG. 3 is a conceptual diagram of the manufacturing method according to the first embodiment.

Referring to FIG. 3, the mold 2 is configured as described above and below and prepared in the manufacturing device 1. Further, each time one of the metal-resin composites 100 is manufactured, a compound of the extruded material 200 and the resin material 300 is prepared. The second mold 20 is positioned at the retracted position. In a state in which the second mold 20 is located at the retracted position, the upper molding surface 43 is sufficiently separated upward from an upper end surface of the first mold 10 in order to facilitate installation of the extruded material 200 and the compound and extraction of the metal-resin composite 100.

Figure 4:
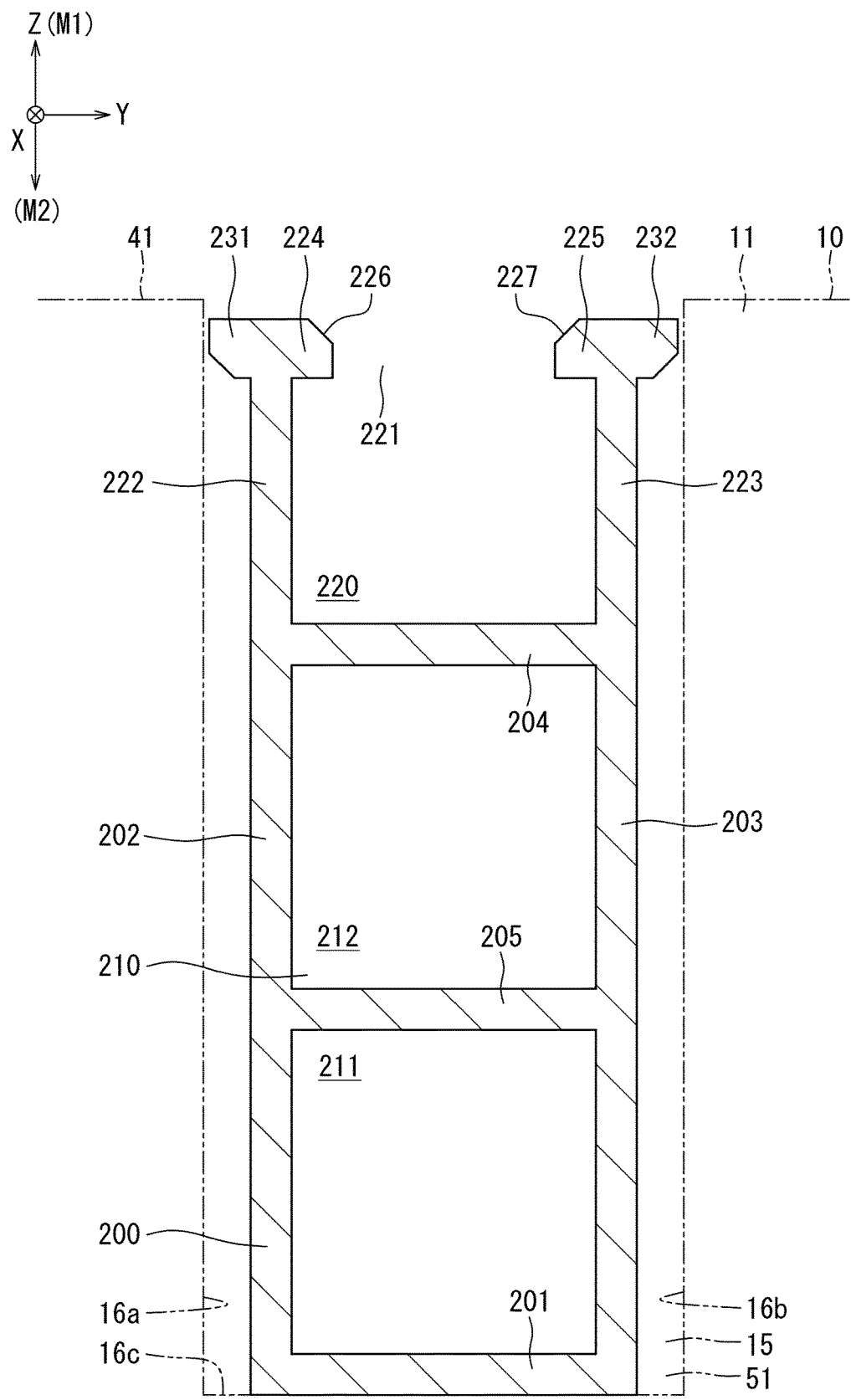
FIG. 4 is a cross-sectional view of an extruded material prepared in manufacturing of the metal-resin composite according to the first embodiment.

Referring to FIG. 4, the extruded material 200 to be prepared has a bottom wall 201, a pair of side walls 202 and 203, and a top wall 204. A pair of the side walls 202 and 203 extend in the height direction Z by forming long sides of a rectangular cross section, and the bottom wall 201 and the top wall 204 extend in the width direction Y by forming short sides of the rectangular cross section. A pair of the side walls 202 and 203 are erected upward from a pair of side edges of the bottom wall 201. The top wall 204 connects upper portions of the side walls 202 and 203.

The extruded material 200 has a hollow 210 defined by an inner surface of the walls 201 to 204 and one or more partition walls 205 that partition the hollow 210. The hollow 210 is open at both ends in the longitudinal direction X. In the present embodiment, the partition wall 205 is single, and connects inner surfaces of the side walls 202 and 203 between the bottom wall 201 and the top wall 204 in the height direction Z, and the hollow 210 is divided into a first chamber 211 and a second chamber 212 in the height direction Z by the partition wall 205. However, a plurality of the partition walls may be disposed at intervals in the height direction Z, or the partition wall may be omitted.

The extruded material 200 has a pair of flanges 222 and 223. A pair of the flanges 222 and 223 are a portion extended upward from a pair of the side walls 202 and 203. An outer surface of the flange 222 is substantially flush with an outer surface of the side wall 202 and forms an overall outer surface of the extruded material 200 together with an outer surface of the side wall 202. A plate thickness of the flange 222 is the same as, or thinner or thicker than a plate thickness of the side wall 202. A relationship between the flange 223 and the side wall 203 is similar to the above.

The extruded material 200 has an inner space 220 defined by an outer surface (that is, an upper surface) of the top wall 204 and inner surfaces of a pair of the flanges 222 and 223. The inner space 220 is open both in the longitudinal direction X and upwards. Tip portions (that is, upper end portions) in the height direction Z of a pair of the flanges 222 and 223 form an opening 221 of the inner space 220.

The extruded material 200 has a pair of protruding portions 224 and 225 provided at tip portions of a pair of the flanges 222 and 223. Each of the protruding portions 224 and 225 protrudes inward in the width direction Y from the tip portion of a corresponding one of the flanges 222 and 223. In other words, the protruding portions 224 and 225 protrude so as to approach each other toward the inner space 220. By the above, the upper opening 221 is narrowed as compared with a case where there is none of the protruding portions 224 and 225. Further, a lower surface of the protruding portions 224 and 225 faces the inner space 220.

The extruded material 200 has inner inclined surfaces 226 and 227 provided at the tip portions (in particular, in the present embodiment, a pair of the protruding portions 224 and 225) of a pair of the flanges 222 and 223. The inner inclined surfaces 226 and 227 connect an upper surface and a side surface of the protruding portions 224 and 225, and are inclined to the inner side in the width direction Y toward the lower side. The lower side as viewed from the protruding portions 224 and 225 corresponds to the base end side of the flanges 222 and 223 and also corresponds to the mold closing direction M2. The inner side corresponds to the inner space 220 side and also corresponds to the side away from the housing portion 15.

The extruded material 200 has protrusions 231 and 232 protruding from a surface of the extruded material 200. In the present embodiment, the protrusions 231 and 232 form a pair in the width direction Y. A pair of the protrusions 231 and 232 are provided on outer surfaces of a pair of the flanges 222 and 223, and protrude to the outer side in the width direction Y from a pair of the flanges 222 and 223.

In particular, in the present embodiment, a pair of the protrusions 231 and 232 are provided at tip portions of a pair of the flanges 222 and 223, respectively. The protrusion 231 and the protruding portion 224 are integrated at a tip portion of the flange 222, protrude from the tip portion to both sides in the width direction Y, and form a common upper surface wider than a plate thickness of the flange 222. The same applies to a relationship among the protrusion 232, the protruding portion 225, and the flange 223.

Next, referring to FIGS. 3 and 4, the prepared extruded material 200 is accommodated in the housing portion 15. After the above, the prepared compound of the resin material 300 is disposed on the first mold 10. The extruded material 200 and the compound may be manually installed. The manufacturing device 1 may include a manipulator for installing the extruded material 200 and the compound.

A width of the housing portion 15 is defined as an interval between the inner side surfaces 16a and 16b in the width direction Y. A depth of the housing portion 15 is defined as a length in the opening and closing direction from the lower molding surface 41 to the inner bottom surface 16c. A width of the extruded material 200 is defined as an interval between side end surfaces of the protrusions 231 and 232 in the width direction Y. A height of the extruded material 200 is defined as a length in the height direction Z from a lower surface of the bottom wall 201 to an upper surface (that is, a common upper surface of the protrusions 231 and 232 and the protruding portions 224 and 225) of the flanges 221 and 222. A difference between maximum and minimum allowable dimensions is defined as dimensional tolerance. Dimensional tolerance of the extruded material 200 is set within a range of 0.5 to 1.0 mm, for example. The extruded material 200 may be formed in consideration of geometric tolerance such as flatness of a lower surface of the bottom wall 201 and an outer surface of the side walls 202 and 203 in addition to dimensional tolerance. The prepared extruded material 200 is molded within tolerance.

In accommodation of the extruded material 200, the extruded material 200 is inserted into the housing portion 15 in an insertion posture with the bottom wall 201 facing downward. A width of the housing portion 15 is the same as maximum allowable dimension of a width of the extruded material 200. For this reason, the extruded material 200 molded within dimensional tolerance can move downward in the housing portion 15 without interfering with the housing portion 15.

The extruded material 200 is easily inserted until the bottom wall 201 is seated on the inner bottom surface 16c in light of a point that extruded material 200 does not interfere with the housing portion 15 and a point that its own weight acts. A depth of the housing portion 15 is larger than maximum allowable dimension of a height of the extruded material 200. For this reason, in a housed state of the extruded material 200, the entire extruded material 200 is housed in the housing portion 15, and an upper surface of the extruded material 200 is positioned slightly below the lower molding surface 41. A side surface of the protrusions 231 and 232 faces an upper end portion of an inner side surface of the housing portion 15 with a very small clearance. Below the protrusions 231 and 232, a gap 51 is formed between the inner surface 16 of the housing portion 15 and a surface of the extruded material 200 (for example, an outer surface of the side walls 202 and 203, a lower surface of the bottom wall 201, and the like).

Referring to FIG. 3, next, the mold 2 is preheated by the heating unit 4 so that a temperature of the mold 2 is increased to a predetermined temperature. Next, a compound (for example, SMC) of the resin material 300 is placed on the lower molding surface 41 and covers the extruded material 200 accommodated in the housing portion 15 from above.

Figure 5:
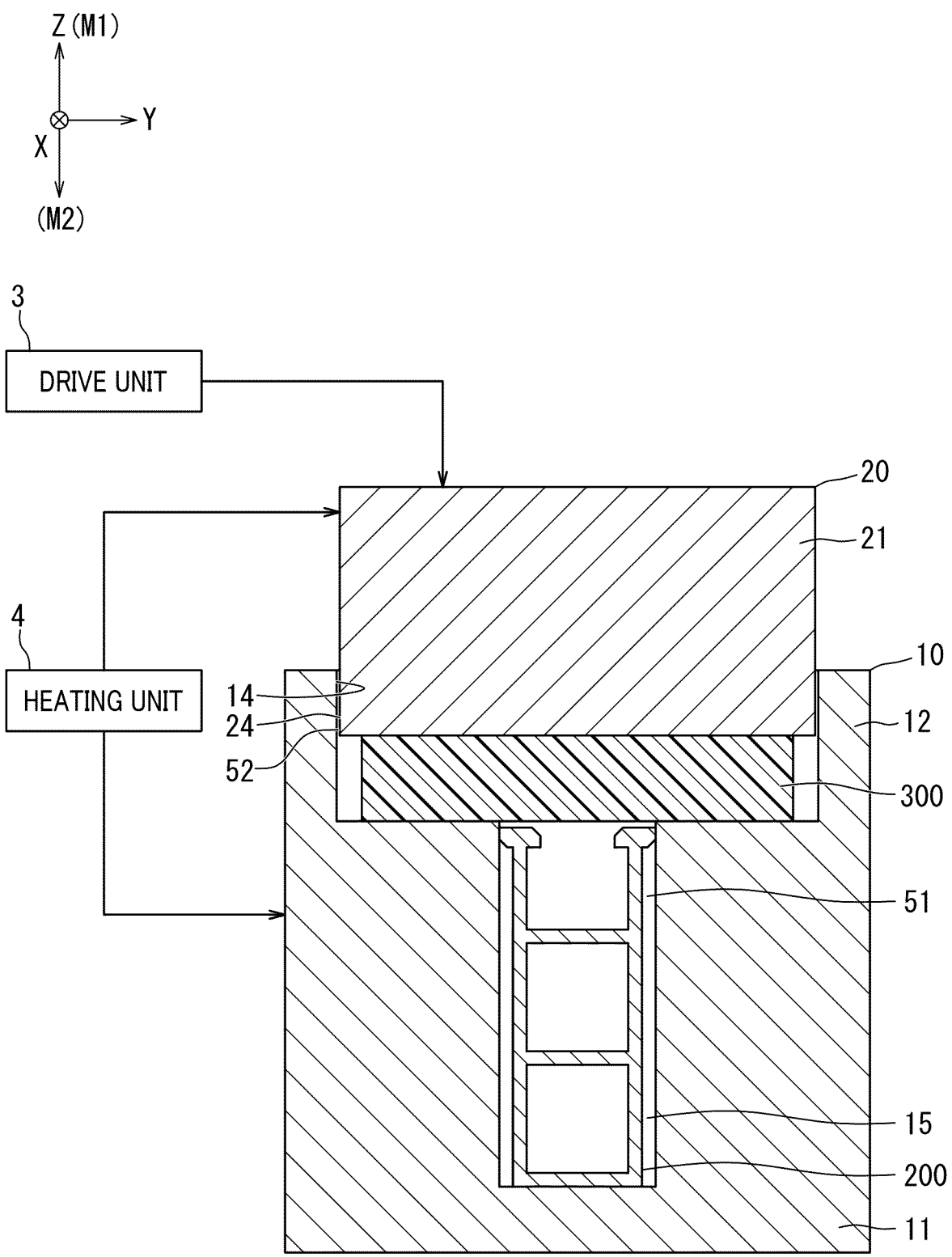
FIG. 5 is a conceptual diagram of the manufacturing method according to the first embodiment.

Next, referring to FIG. 5, the drive unit 3 moves the second mold 20 in the mold closing direction M2 (downward) from the retracted position to the bottom dead center. In a process of downward movement of the second mold 20, the main body portion 21 is internally fitted to the shoulder portion 12, and the upper mating surface 24 faces the lower mating surface 14 with a slight mold gap 52. The second mold 20 is guided by the shoulder portion 12 and slides downward. The second mold 20 presses the compound of the resin material 300 downward. The compound is softened by heat of the mold 2 and flows by being pressed by molding pressure applied from the second mold 20.

Figure 6:
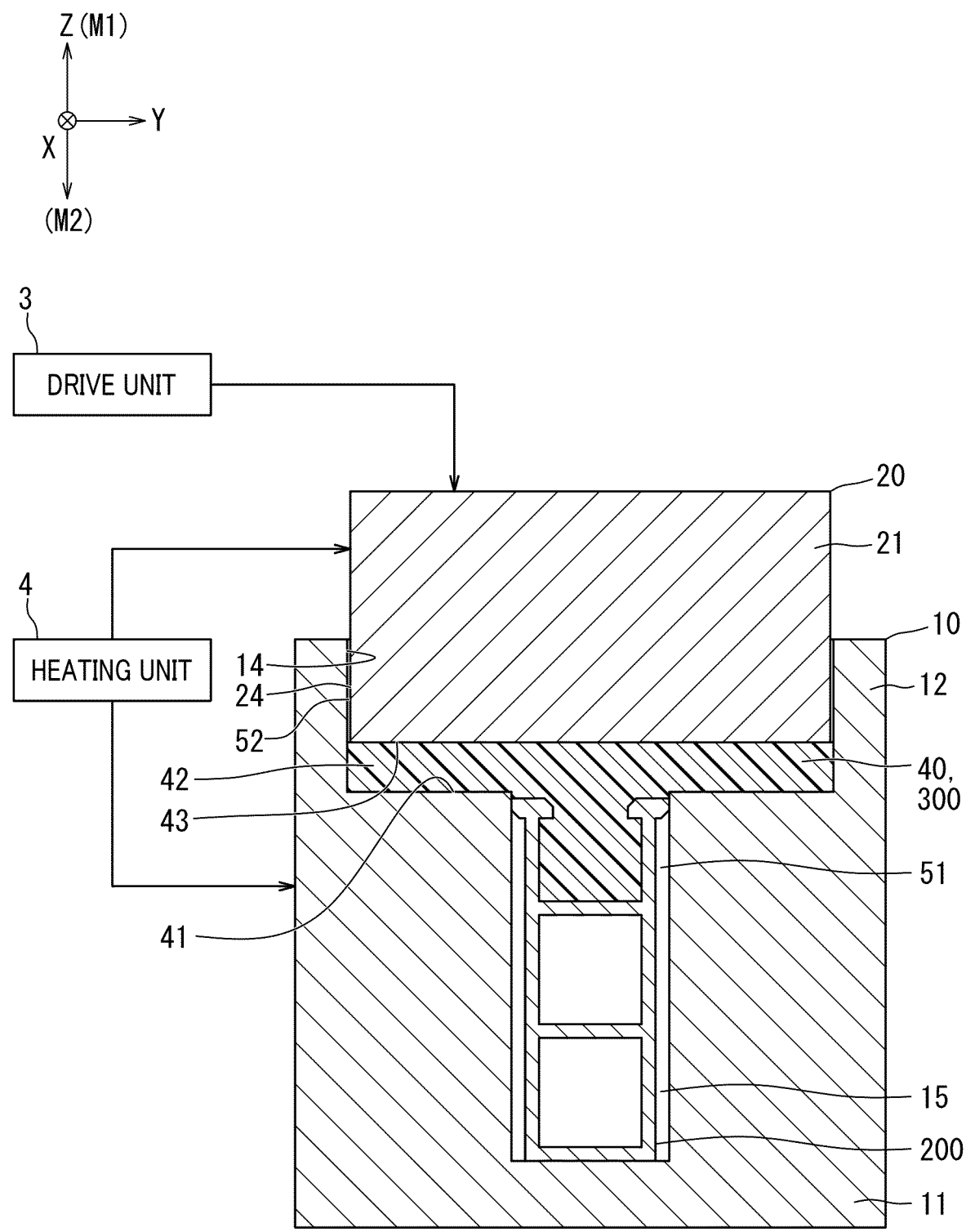
FIG. 6 is a conceptual diagram of the manufacturing method according to the first embodiment.

Referring to FIG. 6, in a bottom dead center state where the second mold 20 is positioned at the bottom dead center, the upper molding surface 43 and the lower molding surface 41 are separated from each other in the opening and closing direction. The lower mating surface 14 is a portion of an inner surface of the shoulder portion 12 on the upper side than the upper molding surface 43 in the bottom dead center state of the second mold 20. The side molding surface 42 is a portion of the inner surface of the shoulder portion 12 on the lower side than the upper molding surface 43 in the bottom dead center state of the second mold 20. The lower molding surface 41, the side molding surface 42 and the upper molding surface 43 define a cavity 40 intended to be filled with the compound.

The cavity 40 communicates with the inside of the housing portion 15 formed in the lower molding surface 41, and communicates with the inner space 220 via the upper opening 221 of the extruded material 200 in the housing portion 15. The inner space 220 is intended as a target to be filled with the resin material 300. In other words, the inner space 220 constitutes a part of the cavity 40, and the cavity 40 is also defined by a surface of the extruded material 200. The cavity 40 communicates with the mold gap 52. Like the mold gap 52, the gap 51 is not intended as a target to be filled with the resin material 300.

Figure 7:
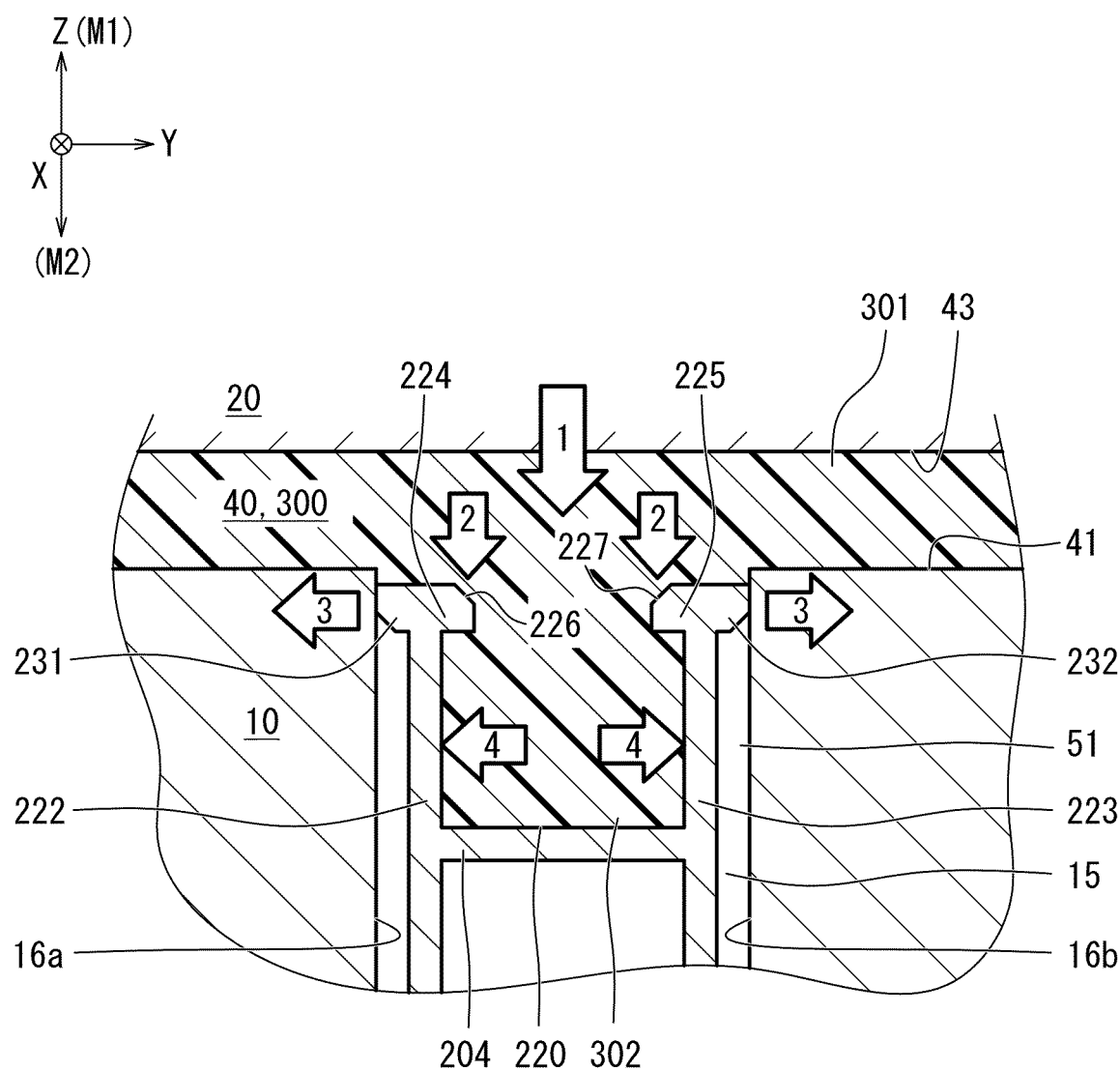
FIG. 7 is a partially enlarged view of FIG. 6.

In this regard, referring also to FIG. 7, the resin material 300 flows into the housing portion 15 by being pressed downward in a process of downward movement of the second mold 20 (see Arrow 1). After the resin material 300 reaches the same level as an upper surface of the extruded material 200 in the opening and closing direction, the upper opening 221 and a clearance between the protrusions 231 and 232 and the inner surface 16 of the housing portion 15 are assumed as a flow path of the resin material 300. However, since this clearance has much higher inflow resistance than the upper opening 221, the resin material 300 is likely to pass through the upper opening 221.

At this time, the resin material 300 applies downward pressure to the inner inclined surfaces 226 and 227 based on molding pressure (see Arrow 1) applied from the second mold 20 (see Arrow 2). By the above, the protruding portions 224 and 225 are pushed to the outer side in the width direction Y by the action of a wedge, and the flanges 222 and 223 are elastically deformed to the outer side in the width direction Y (see Arrow 3). Further, the resin material 300 that flows into the inner space 220 presses a surface defining the inner space 220 (see the Arrow 4) based on the molding pressure applied from the second mold 20, which deforms the flanges 222 and 223 to the outer side in the width direction Y (see Arrow 3). However, the inner inclined surfaces 226 and 227 may be omitted, and an end surface of the protruding portions 224 and 225 may be perpendicularly connected to an upper surface. Even in this case, this molding pressure can be applied perpendicularly to an inner surface of an end portion, and deforming deformation of the flanges 222 and 223 in a direction of Arrow 3 can be promoted.

By the above, the protrusions 231 and 232 come into close contact with the inner side surfaces 16a and 16b of the housing portion 15, respectively (see Arrow 3). A deformation direction of the flanges 222 and 223 is along a normal direction of the inner side surfaces 16a and 16b. For this reason, the protrusions 231 and 232 are easily brought into close contact with the inner side surfaces 16a and 16b by using elastic deformation of the flanges 222 and 223.

In this manner, the gap 51 can be closed by an action of a wedge before the resin material 300 flows into the gap 51.

By the above, the cavity 40 is disconnected from the gap 51, and the resin material 300 can be prevented from unintentionally flowing into the gap 51. Note that the mold gap 52 (see FIG. 6) is narrow and has high inflow resistance. For this reason, even if the resin material 300 flows into the mold gap 52, an amount of the resin material 300 is small.

Although not illustrated in detail, the resin material 300 is cured when a predetermined period elapses in a state where the second mold 20 is positioned at the bottom dead center. After the resin material 300 is cured, the drive unit 3 moves the second mold 20 to the retracted position in the mold opening direction M1 (upward). Next, the metal-resin composite 100 is taken out from the first mold 10.

Since the resin material 300 is prevented from flowing into the gap 51, production efficiency of the metal-resin composite 100 is increased. That is, since an amount of the resin material 300 cured in the housing portion 15 is small, mold release resistance can be made low. After mold releasing, operation of peeling an unnecessary portion of the resin material 300 from a surface of the extruded material 200 can also be simplified, and only minimum deburring is required. Since leakage of the compound is prevented, it is easy to secure an appropriate amount of the resin material 300 in the cavity 40, and a non-defective product rate and the yield are improved.

Returning to FIGS. 1A and 1B, the resin material 300 that is cured has a plate portion 301 protruding from the extruded material 200 to both sides in the width direction Y on the extruded material 200, and a protruding portion 302 protruding downward from a center portion in the width direction Y of the plate portion 301. Profiles of the upper molding surface 43, the side molding surface 42, and the lower molding surface 41 (see FIG. 6) are transferred to an upper surface, a side surface, and a lower surface of the plate portion 301, respectively.

The protruding portion 302 is provided on the protrusions 231 and 232 that contribute to closing of the gap 51 (see FIG. 6) in appearance. The inner space 220 is filled with the protruding portion 302 which is brought in contact with a lower surface of the protruding portions 224 and 225. Since the resin material 300 is caulked and joined to the extruded material 200, joining strength of the resin material 300 with respect to the extruded material 200 is improved.

A region between a pair of the flanges 222 and 223 is solid with the resin material 300 and has high strength. For this reason, the flanges 222 and 223 are allowed to be made thin so that flexibility is improved. This makes it possible to achieve both easy filling of the gap 51 (see FIG. 7) and securing of strength of the metal-resin composite 100.

Then, an upper surface of the flanges 222 and 223 is widened more than a plate thickness of the flanges 222 and 223 by integration of the protruding portions 223 and 224 and the protrusions 231 and 232. A contact area between the extruded material 200 and the resin material 300 is secured as large as possible. For this reason, not only the gap 51 (see FIG. 7) can be closed at an upper end of the housing portion 15 so that an unnecessary portion of the resin material 300 can be reduced, but also joining strength of the resin material 300 with respect to the extruded material 200 can be maintained to be high.

Second Embodiment

Hereinafter, a second embodiment will be described focusing on a difference from the above embodiment.

Figure 8:
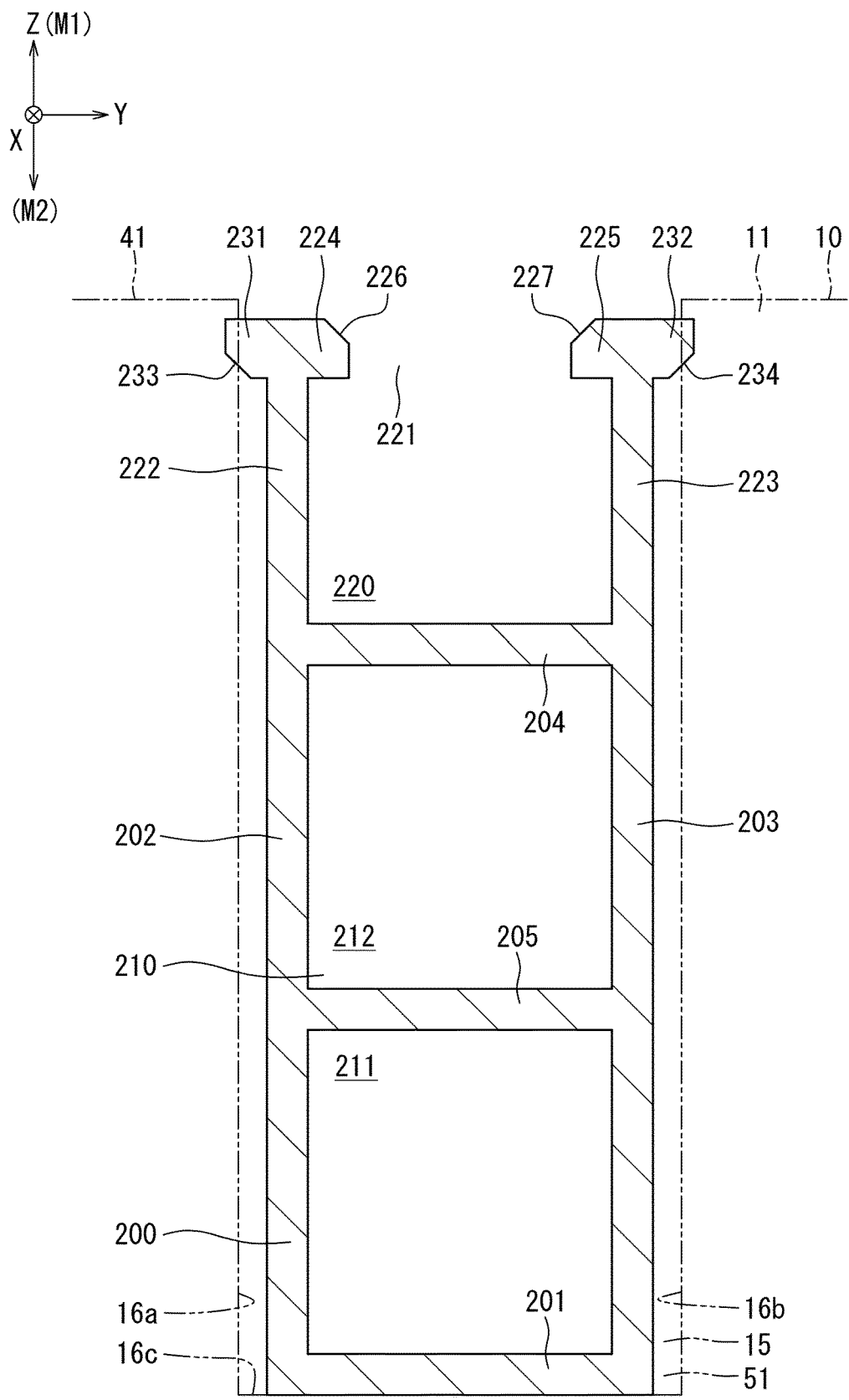
FIG. 8 is a view corresponding to FIG. 4 in a second embodiment.

Referring to FIG. 8, the extruded material 200 further includes outer inclined surfaces 233 and 234 provided on the lower surface side of the protrusions 231 and 232. The outer inclined surfaces 233 and 234 connect a side surface of the protrusions 231 and 232 and an outer surface of the flanges 222 and 223, and are inclined downward toward the inside in the width direction Y.

A relationship between a depth of the housing portion 15 and a height of the extruded material 200 is the same as that in the first embodiment. A width of the housing portion 15 is smaller than maximum allowable dimension of a width of the extruded material 200. That is, the housing portion 15 may cause, on design, an interference with the extruded material 200 molded within dimensional tolerance.

A width of the housing portion 15 may be smaller than minimum allowable dimension of a width of the extruded material 200. In this case, the housing portion 15 causes interference on design with any of the extruded materials 200 molded within dimensional tolerance. A width of the housing portion 15 may be set between maximum allowable dimension and minimum allowable dimension of a width of the extruded material 200, for example, may be equal to reference dimension of the width. In a case where a width of the extruded material 200 is smaller than the reference dimension, the extruded material 200 is inserted into the housing portion 15 without interfering with the housing portion 15 as in the first embodiment.

Figure 9:
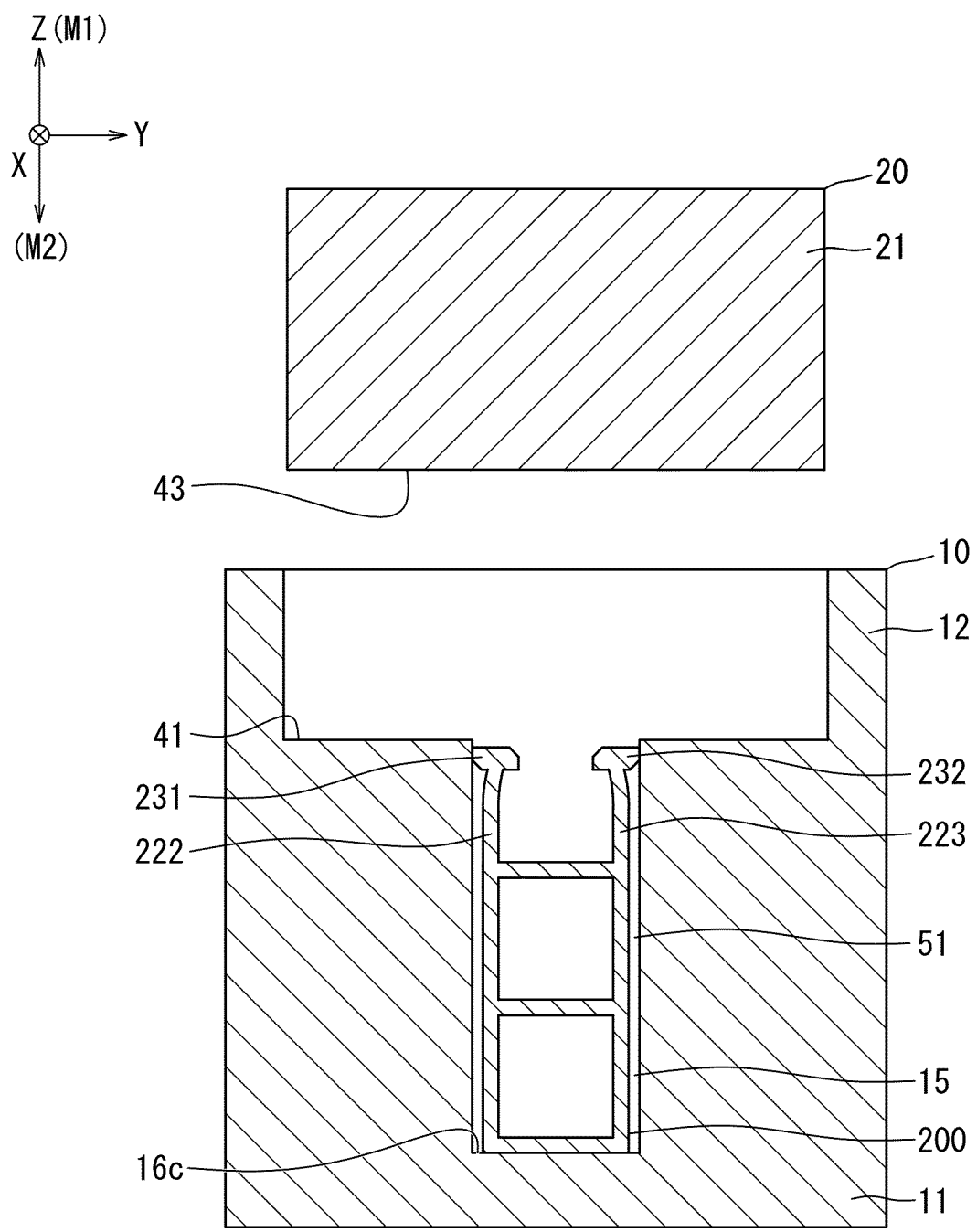
FIG. 9 is a view corresponding to FIG. 3 in the second embodiment.

Referring to FIG. 9, in a case where a width of the extruded material 200 is larger than a width of the housing portion 15, when the extruded material 200 is accommodated in the housing portion 15 from above in the insertion posture, substantially the entire extruded material 200 is inserted into the housing portion 15 without interfering with the housing portion 15. Immediately before completion of the insertion, the outer inclined surface 233 abuts on a corner between the inner side surface 16a of the housing portion 15 and the lower molding surface 41, and the outer inclined surface 234 abuts on a corner between the inner side surface 16b of the housing portion 15 and the lower molding surface 41. When a further downward force is applied to the extruded material 200, the protrusions 231 and 232 move inward in the width direction Y by an action of a wedge, and the flanges 222 and 223 are elastically deformed inward in the width direction Y. By the above, the extruded material 200 can move downward with respect to the first mold 10. The extruded material 200 moves downward until the bottom wall 201 is seated on the inner bottom surface 16c of the housing portion 15.

Figure 10:
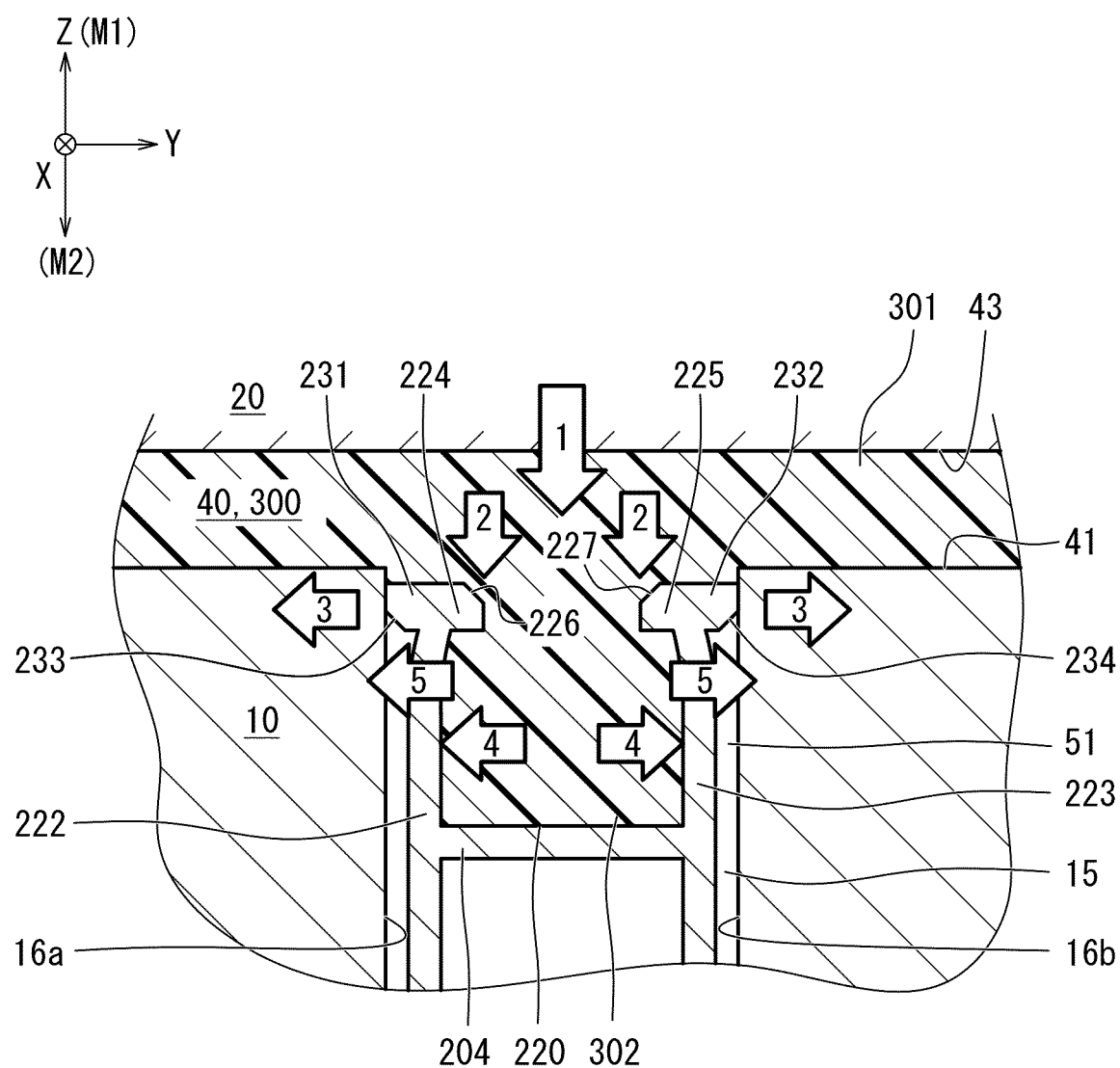
FIG. 10 is a view corresponding to FIG. 7 in the second embodiment.

Referring to FIG. 10, deformation of the flanges 222 and 223 remains within an elastic range. The flanges 222 and 223 exert a reaction force due to elastic deformation to the outer side in the width direction Y (the side approaching the inner side surface of the housing portion 15) in order to restore the original shape (see Arrow 5). Side surfaces of the protrusions 231 and 232 are pressed against the inner side surfaces 16a and 16b of the housing portion 15 by this reaction force, and are brought into close contact with the inner side surfaces 16a and 16b (see Arrow 3).

After the above, as in the first embodiment illustrated in FIGS. 5 and 6, a compound of the resin material 300 is placed in the first mold 10 and pressed at a high temperature and a high pressure. In the present embodiment, the gap 51 is already filled before the resin material 300 is press-molded. For this reason, it is possible to more reliably prevent the resin material 300 from flowing into the gap 51. Moreover, as in the first embodiment, the flanges 222 and 223 are pushed to the outer side in the width direction Y based on molding pressure applied from the resin material 300 to the inner inclined surfaces 226 and 227 and an inner surface of the flanges 222 and 223 (see Arrows 1 to 4 in FIG. 10). Therefore, sealability of the cavity 40 is further enhanced.

Since the protrusions 231 and 232 are in close contact with the inner surface 16 of the housing portion 15 by a reaction force due to elastic deformation of the flanges 222 and 223, mold release resistance may be slightly higher than that in the first embodiment, but curing of the resin material 300 in the gap 51 can be more reliably prevented. For this reason production efficiency of the metal-resin composite 100 is as high as that in the first embodiment.

Third Embodiment

Hereinafter, a third embodiment will be described focusing on a difference from the above embodiment.

Figure 11:
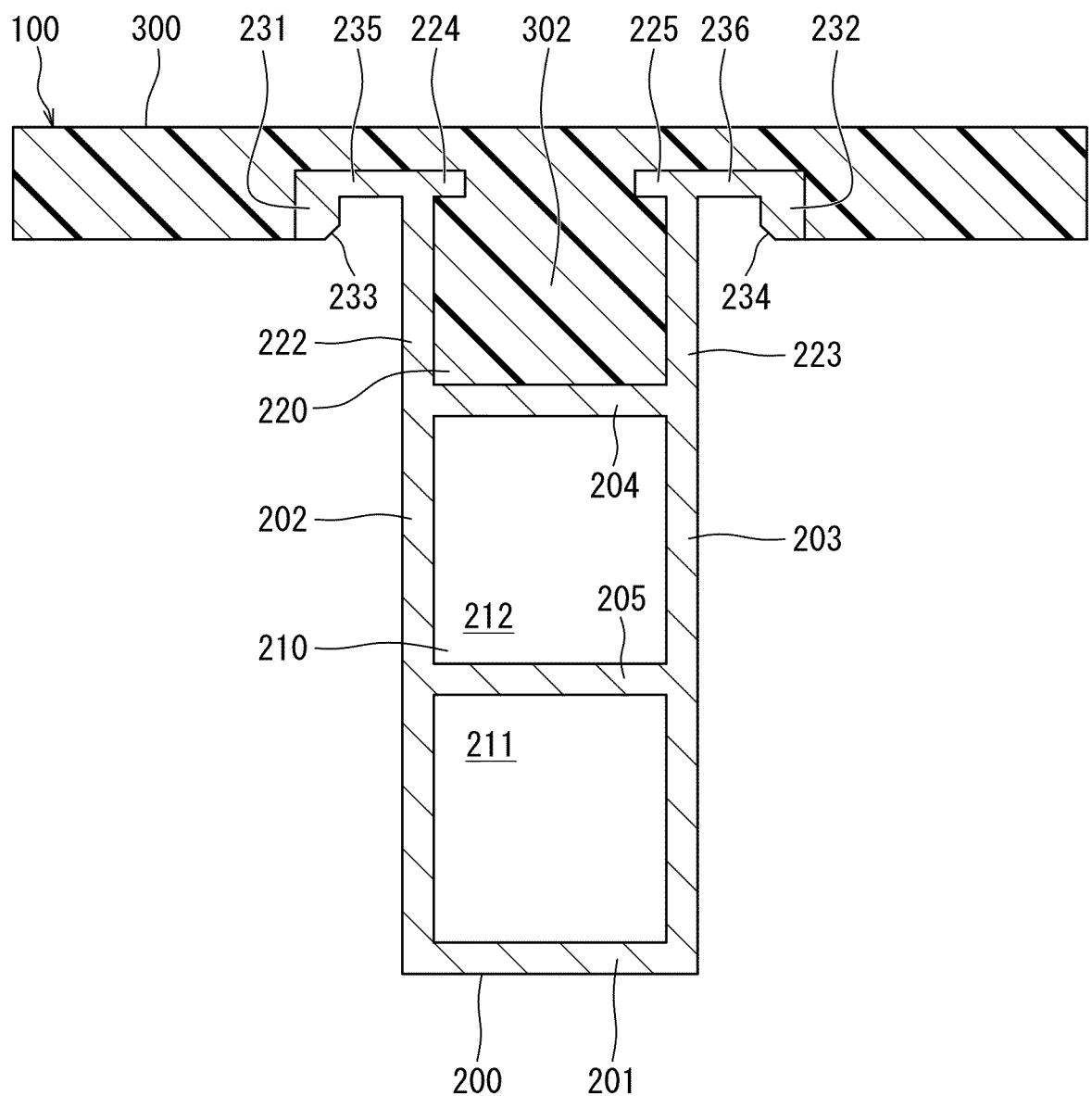
FIG. 11 is a cross-sectional view of the metal-resin composite manufactured by the manufacturing device and method according to a third embodiment.

Referring to FIG. 11, the extruded material 200 has a pair of protruding pieces 235 and 236 protruding outward in the width direction Y from tip portions of a pair of the flanges 222 and 223, respectively. A pair of the protruding pieces 235 and 236 are formed in a flat plate shape extending perpendicularly from the flanges 222 and 223. A pair of the protrusions 231 and 232 are provided at tip portions of a pair of the protruding pieces 235 and 236, respectively. Each of the protrusions 231 and 232 protrudes downward from a corresponding one of the protruding pieces 235 and 236. As described above, the protrusions 231 and 232 are provided on outer surfaces of the flanges 222 and 223 with the protruding pieces 235 and 236 interposed between them.

Each of the protruding pieces 235 and 236 is integrated with a corresponding one of the protruding portions 224 and 225 at a tip portion of a corresponding one of the flanges 222 and 223 to form a common upper surface. Note that, in the present embodiment, the case where the protruding portions 224 and 225 do not have the inner inclined surfaces 226 and 227 (see FIG. 4) is exemplified, but the protruding portions 224 and 225 may have the inner inclined surfaces 226 and 227 as in the first embodiment.

Figure 12:
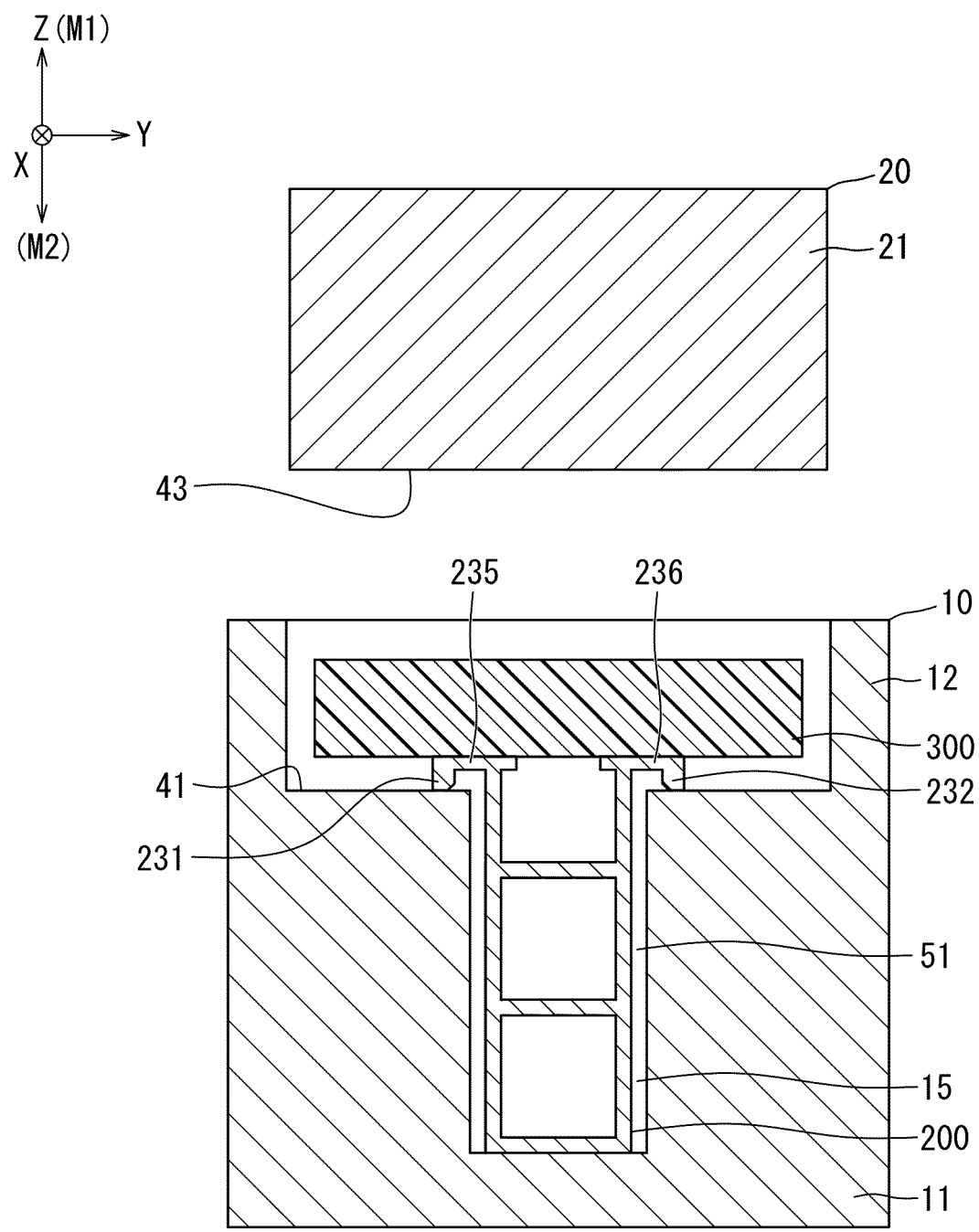
FIG. 12 is a view corresponding to FIG. 3 in the third embodiment.

Referring to FIG. 12, a width of the housing portion 15 is larger than maximum allowable dimension of an interval between outer surfaces of the side walls 202 and 203. A depth of the housing portion 15 is smaller than minimum allowable dimension of a length from a lower surface of the bottom wall 201 to a lower surface of the protruding pieces 235 and 236, and further smaller than minimum allowable dimension of a length from the lower surface of the bottom wall 201 to a lower surface of a protrusion. By the above, as in the first embodiment, the extruded material 200 is inserted downward into the housing portion 15 without interfering with the housing portion 15 until the bottom wall 201 is seated on the inner bottom surface 16c of the housing portion 15.

In an accommodation state of the extruded material 200, an upper portion of the extruded material 200 protrudes upward with respect to the housing portion 15 or the lower molding surface 41. In particular, in the present embodiment, not only the protruding pieces 235 and 236 but also the protrusions 231 and 232 do not interfere with the lower molding surface 41 based on the dimensional relationship described above. The protruding pieces 235 and 236 extend in the width direction Y above the lower molding surface 41, and lower surfaces of the protrusions 231 and 232 face the lower molding surface 41 with a slight clearance in the opening and closing direction. The compound of the resin material 300 may be placed on the protruding pieces 235 and 236.

Figure 13:
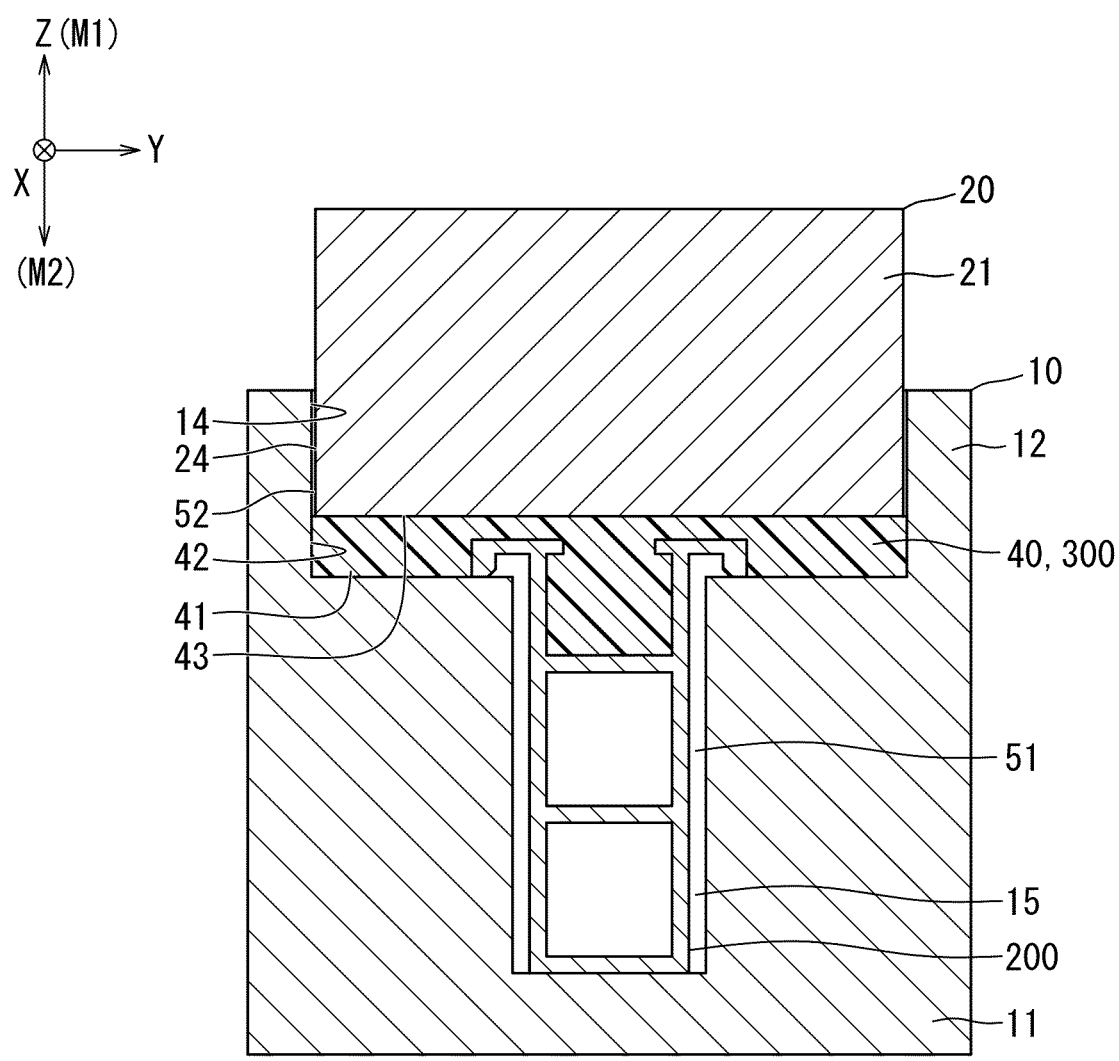
FIG. 13 is a view corresponding to FIG. 6 in the third embodiment.
Figure 14:
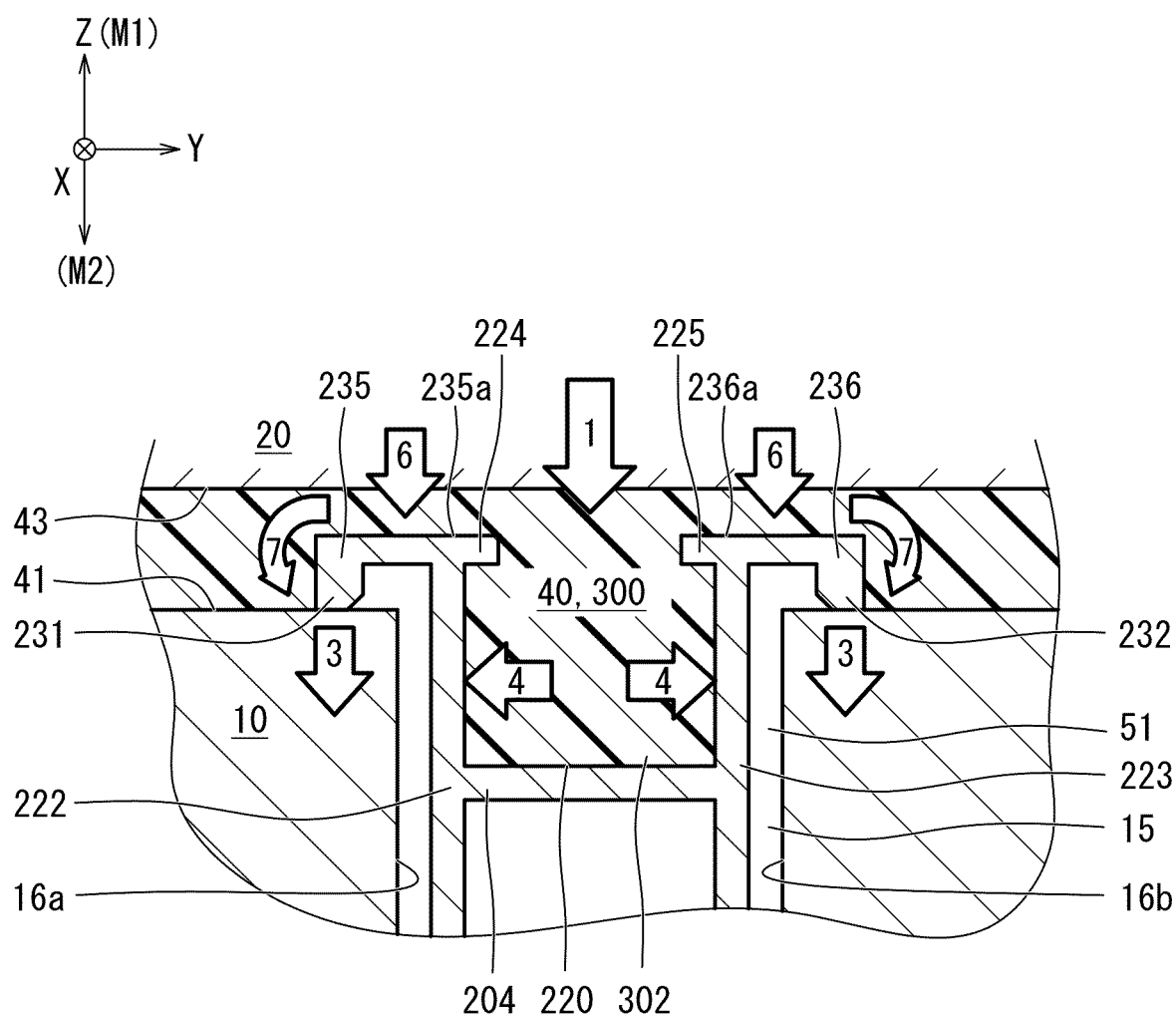
FIG. 14 is a view corresponding to FIG. 7 in the third embodiment.

Referring to FIGS. 13 and 14, when the second mold 20 moves downward, molding pressure acts downward on upper surfaces 235a and 236a of the protruding pieces 235 and 236 via the resin material 300 (see Arrow 6). The upper surfaces 235a and 236a function as pressure receiving surfaces that receive the molding pressure. The protruding pieces 235 and 236 are elastically deformed downward, and the protrusions 231 and 232 come into close contact with a peripheral edge portion of the housing portion 15 in the lower molding surface 41 (see Arrow 3).

Note that, also in the present embodiment, similarly to the first and second embodiments, molding pressure acts on inner surfaces of the flanges 222 and 223 toward the outer side in the width direction Y via the resin material 300 that has flowed into the inner space 220 (see Arrow 4). The flanges 222 and 223 are to be deformed outward in the width direction Y about base end portions (near portions where the top wall 204 is provided) of the flanges 222 and 223, by which the protrusions 231 and 232 are to be moved downward (see Arrow 7). This action increases degree of close contact of the protrusions 231 and 232 with a peripheral edge portion of the housing portion 15 (see Arrow 3).

The protrusions 231 and 232 are in close contact with the outside of the housing portion 15 rather than an inner surface of the housing portion 15, so that the cavity 40 is disconnected from the gap 51. Therefore, it is possible to prevent the resin material 300 from being cured inside the housing portion 15 and outside the extruded material 200, and mold release resistance is further reduced.

Although not illustrated in detail, a depth of the housing portion 15 may be larger than minimum allowable dimension of a length from a lower surface of the bottom wall 201 to lower surfaces of the protrusions 231 and 232. In this case, even in a case of the extruded material 200 molded within dimensional tolerance, a length from the lower surface of the bottom wall 201 to the lower surfaces of the protrusions 231 and 232 may be smaller than the depth of the housing portion 15. In such a case, the lower surfaces of the protrusions 231 and 232 abut on the lower molding surface 41 before the bottom wall 201 is seated on the inner bottom surface 16c. As the extruded material 200 further moves downward, the protruding pieces 235 and 236 are elastically deformed. In an accommodation state of the extruded material 200, the protrusions 231 and 232 are in close contact with a peripheral edge portion of the housing portion 15. By the above, the cavity 40 is disconnected from the gap 51 before the resin material 300 is pressurized, and it is possible to more reliably prevent the resin material 300 from flowing into the gap 51.

Fourth Embodiment

Hereinafter, a fourth embodiment will be described focusing on a difference from the above embodiment.

Figure 15A:
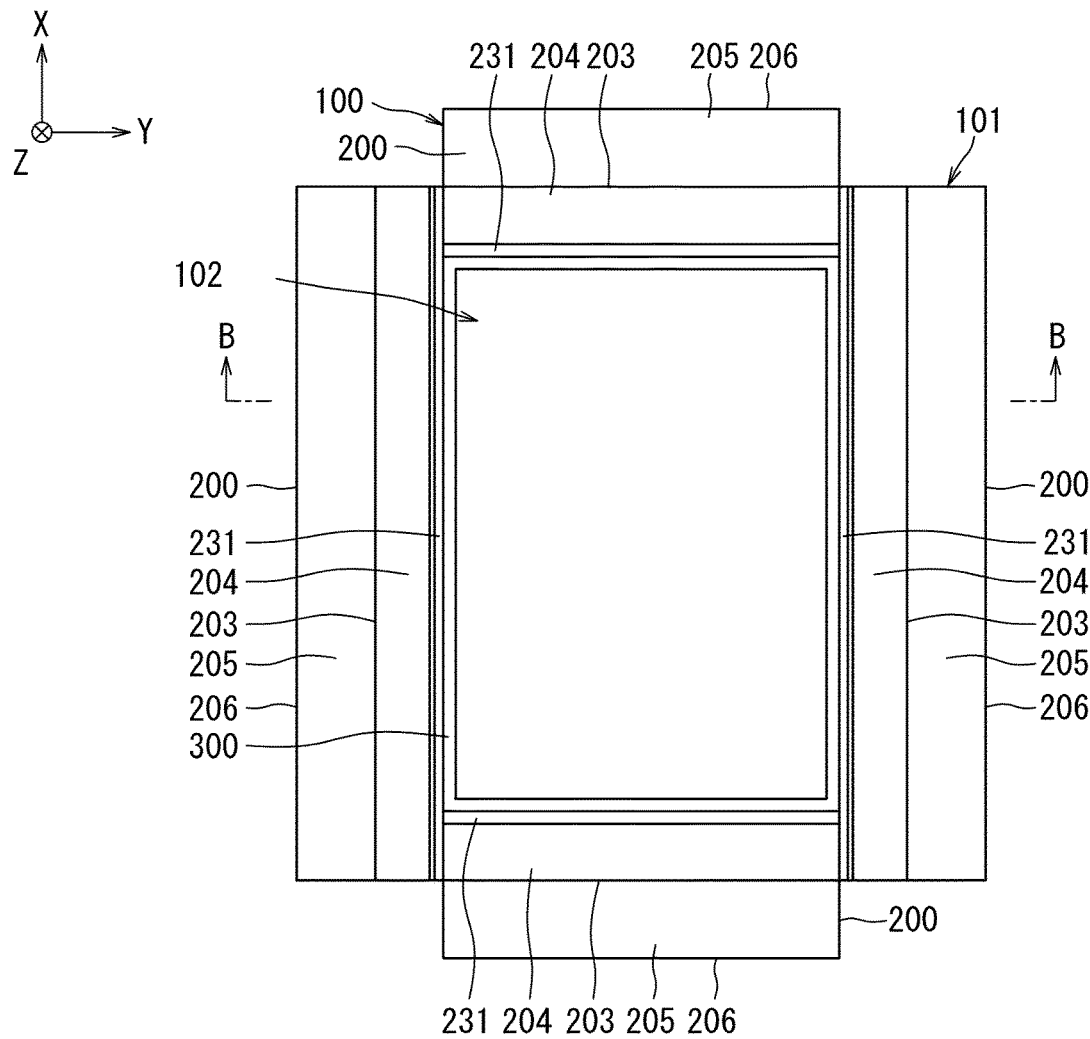
FIG. 15A is a plan view of the metal-resin composite manufactured by the manufacturing device and method according to a fourth embodiment.
Figure 15B:
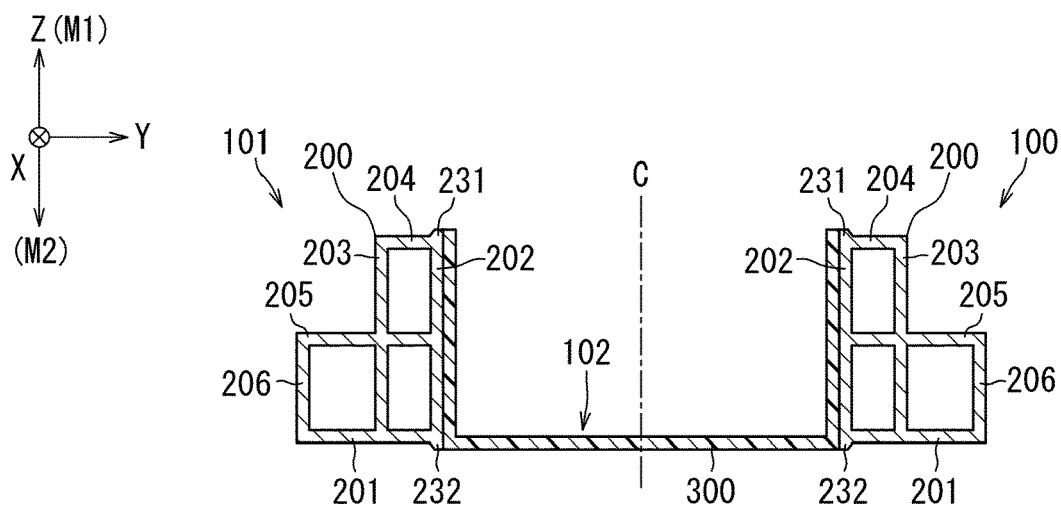
FIG. 15B is a cross-sectional view taken along line B-B in FIG. 15A.

Referring to FIGS. 15A and 15B, the metal-resin composite 100 structurally includes a frame portion 101 having a rectangular frame shape and a bottom plate portion 102 that closes the lower surface side of the frame portion 101, and is formed in a rectangular box shape as a whole. The resin material 300 constitutes the bottom plate portion 102 and also constitutes an inner surface of the frame portion 101. A framework of the frame portion 101 is configured by joining four of the extruded materials 200 in a rectangular frame shape.

Figure 16:
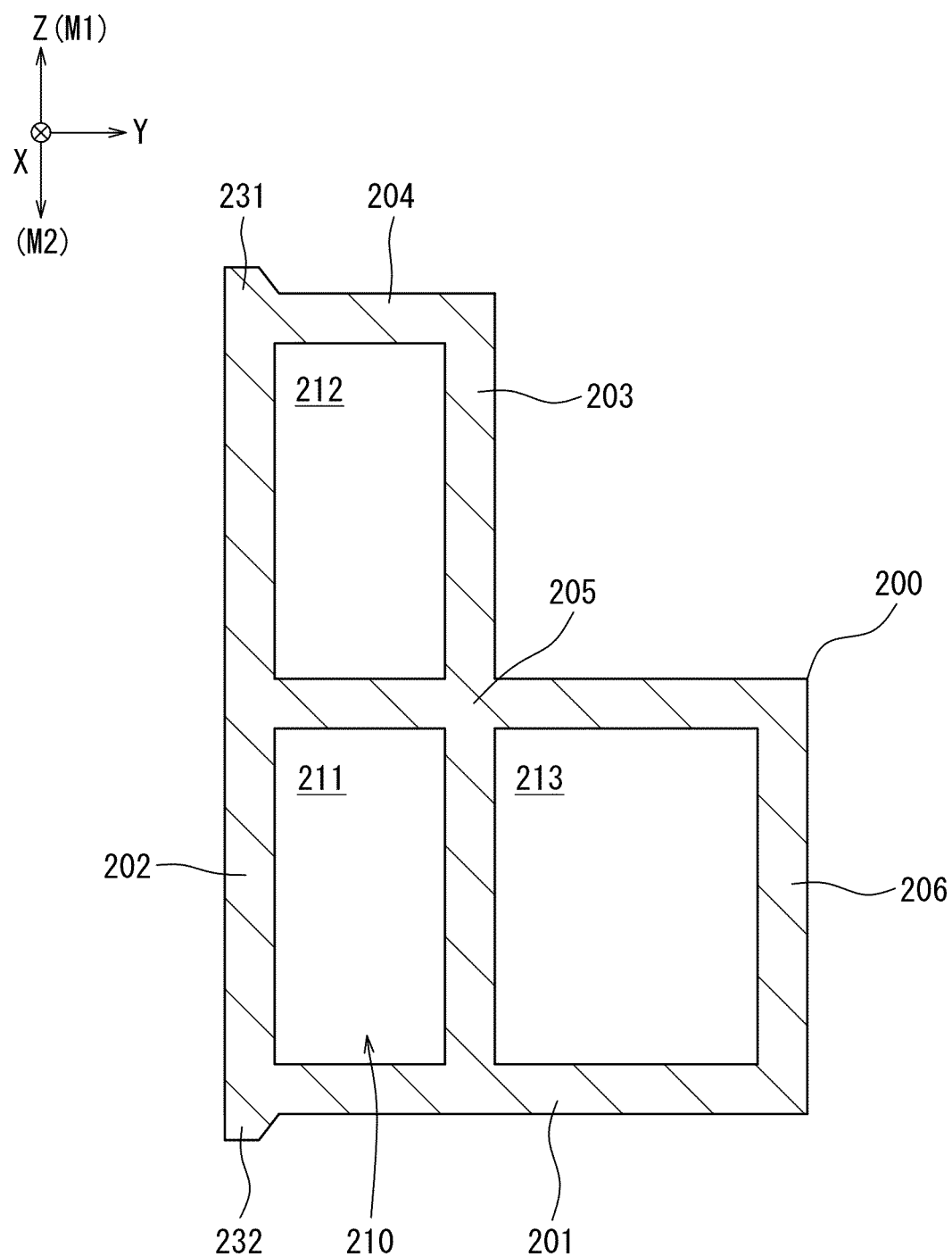
FIG. 16 is a cross-sectional view of an extruded material prepared in manufacturing of the metal-resin composite according to the fourth embodiment.

Referring also to FIG. 16, the extruded material 200 has the bottom wall 201, a pair of the side walls 202 and 203, the top wall 204, and the partition wall 205 as in the above embodiment. However, the extruded material 200 does not include the flanges 221 and 222. The extruded material 200 has an L-shaped cross section as a whole. The bottom wall 201 and the partition wall 205 are extended to the outer side in the width direction Y. Here, the "outer side" refers to the side opposite to the inner side of the frame portion 101 having a rectangular box shape. The extruded material 200 has an outer wall 206 that connects extension portions of the bottom wall 201 and the partition wall 205 to each other in the height direction Z. The hollow 210 includes a third chamber 213 surrounded by an extension portion of the bottom wall portion 201 and the partition wall 205, a lower portion of the side wall 203, and the outer wall 206. The resin material 300 is overlaid on an outer surface of the side wall 202 and constitutes an inner surface of the frame portion 101. The extruded material 200 further includes the protrusions 231 and 232. The protrusion 231 is provided on an upper portion of the extruded material 200, and the protrusion 232 is provided on a lower portion of the extruded material 200. However, the third chamber 213 and the outer wall 206 can be omitted, and the bottom wall 201 and the partition wall 205 do not need to be extended from the side wall 203.

In the present embodiment, the protrusion 231 is provided at a corner between the side wall 202 and the top wall 204, and protrudes upward from the corner. The protrusion 232 is provided at a corner between the side wall 202 and the bottom wall 201, and protrudes downward from the corner. The protrusions 231 and 232 have a wedge-shaped cross section. The protrusion 231 has a pair of side surfaces and an upper surface, and the side surface on the outer side in the width direction is inclined. The protrusion 232 has a pair of side surfaces and an upper surface, and the side surface on the outer side in the width direction is inclined.

Figure 17:
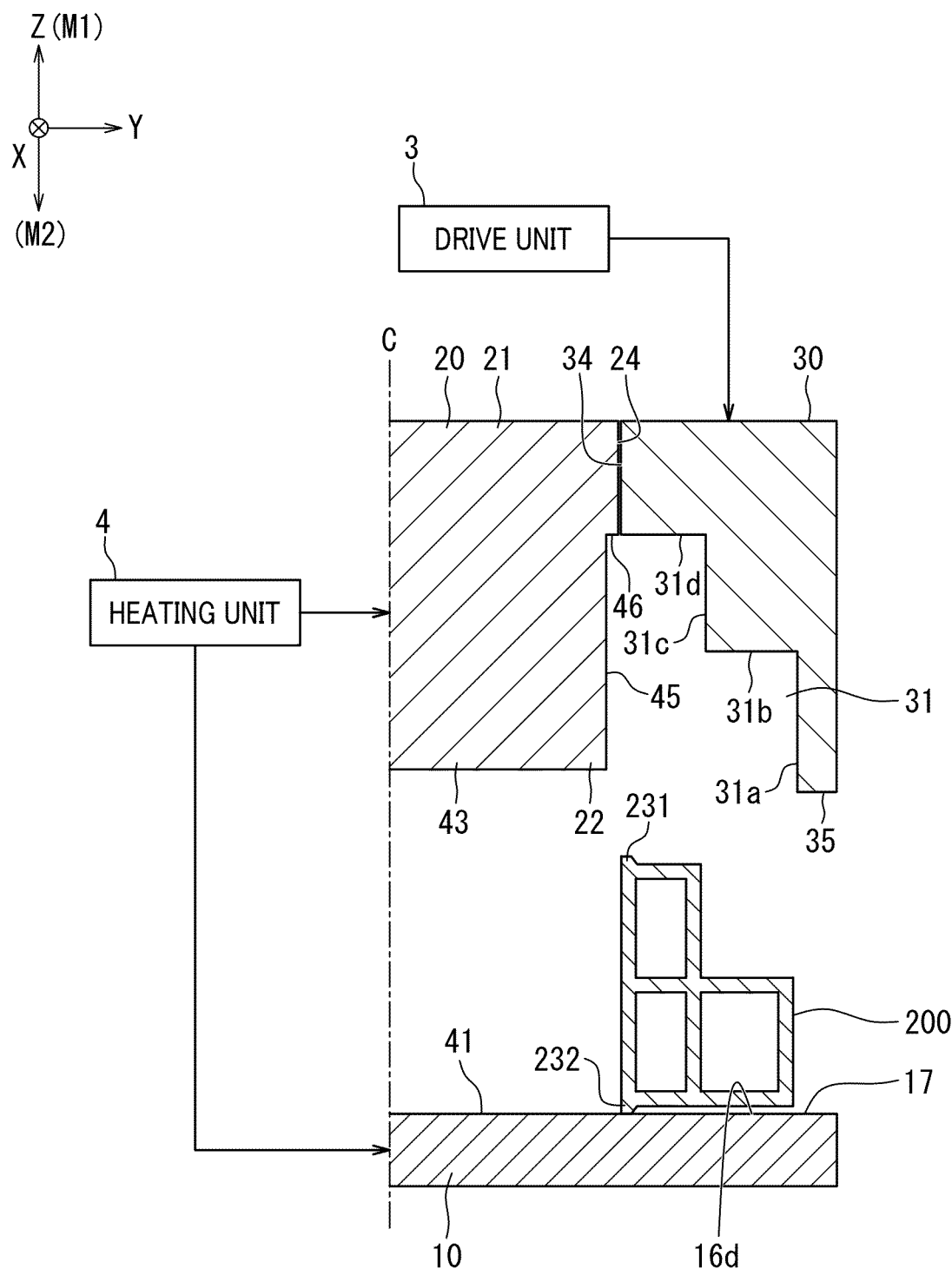
FIG. 17 is a conceptual diagram of the manufacturing device and the manufacturing method according to the fourth embodiment.

Referring to FIG. 17, the mold 2 includes a third mold 30 in addition to the first mold 10 and the second mold 20. The shoulder portion 12 is omitted from the first mold 10. An upper surface of the base portion 11 forms the lower molding surface 41, an extruded material installation surface 16d, and a bottom mating surface 17. The lower molding surface 41 is formed at the center of the upper surface. The extruded material installation surface 16d is formed in a rectangular frame shape surrounding the lower molding surface 41. The bottom mating surface 17 is formed in a rectangular frame shape surrounding the extruded material installation surface 16d.

The second mold 20 has the main body portion 21 and a molding portion 22. The molding portion 22 has a rectangular parallelepiped shape smaller in size than the main body portion 21, and protrudes downward from the main body portion 21. A bottom surface of the molding portion 22 forms a first upper molding surface 44. Four sides of the molding portion 22 form an inner molding surface 45. A step surface having a rectangular frame shape between the molding portion 22 and the main body portion 21 forms a second upper molding surface 46. Four side surfaces of the main body portion 21 form the first upper mating surface 24.

The third mold 30 is configured as a movable mold or an upper mold. The third mold 30 is formed in a rectangular frame shape and slides with respect to the second mold 20. An outer edge portion of a lower surface of the third mold 30 forms a bottom mating surface 35. The third mold 30 has a recessed portion 31 that is recessed upward on the lower surface and forms a housing portion 15 together with the first mold 10. The recessed portion 31 is formed in a mortar shape or an L shape, and is gradually deepened from the outer edge portion. The recessed portion 31 is defined by a first inner side surface 31a, a first inner bottom surface 31b, a second inner side surface 31c, and a second inner bottom surface 31d. The first inner side surface 31a extends upward from an inner peripheral edge of the bottom mating surface 35. The first inner bottom surface 31b horizontally extends from an upper end of the first inner side surface 31a toward the inside of the third mold 30. The second inner side surface 31c extends upward from an inner peripheral edge of the first inner bottom surface 31b. The second inner bottom surface 31d horizontally extends from an upper end of the second inner side surface 31c toward the inside of the third mold 30 and is continuous with an inner side surface of the third mold 30. The inner side surface of the third mold 30 forms a second upper mating surface 34.

Figure 18:
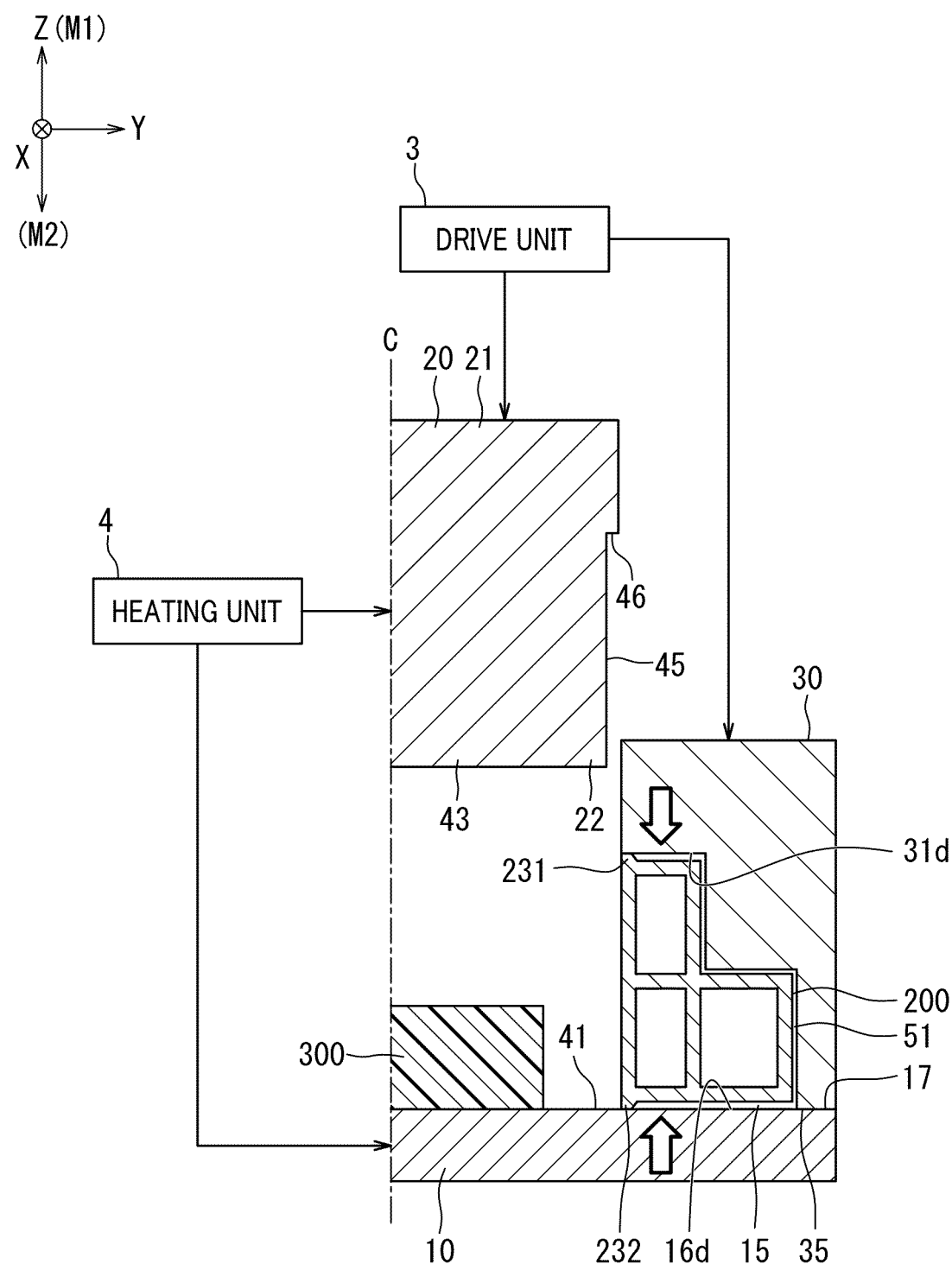
FIG. 18 is a conceptual diagram of the manufacturing method according to the fourth embodiment.

In the present embodiment, as illustrated in FIG. 17, the extruded material 200 is installed on the extruded material installation surface 16d of the first mold 10 in a state where the second mold 20 and the third mold 30 are retracted upward. Next, as illustrated in FIG. 18, the compound of the resin material 300 is placed on the lower molding surface 41, and the third mold 30 is moved downward. By the above, the extruded material 200 is accommodated in the housing portion 15 surrounded by the recessed portion 31 and the extruded material installation surface 16d. In this accommodated state, molding pressure is applied to the extruded material 200 from the third mold 30 (see a white arrow). By the above, the protrusion 231 comes into close contact with the second inner bottom surface 31d of the third mold 30, and the protrusion 232 comes into close contact with the extruded material installation surface 16d of the first mold 10 (see a white arrow). Note that, even if the extruded material 200 is bent or twisted, the extruded material 200 is elastically deformed and corrected by the molding pressure, and the protrusions 231 and 232 are pressed against the molds 10 and 30 in the longitudinal direction X entirely.

Figure 19:
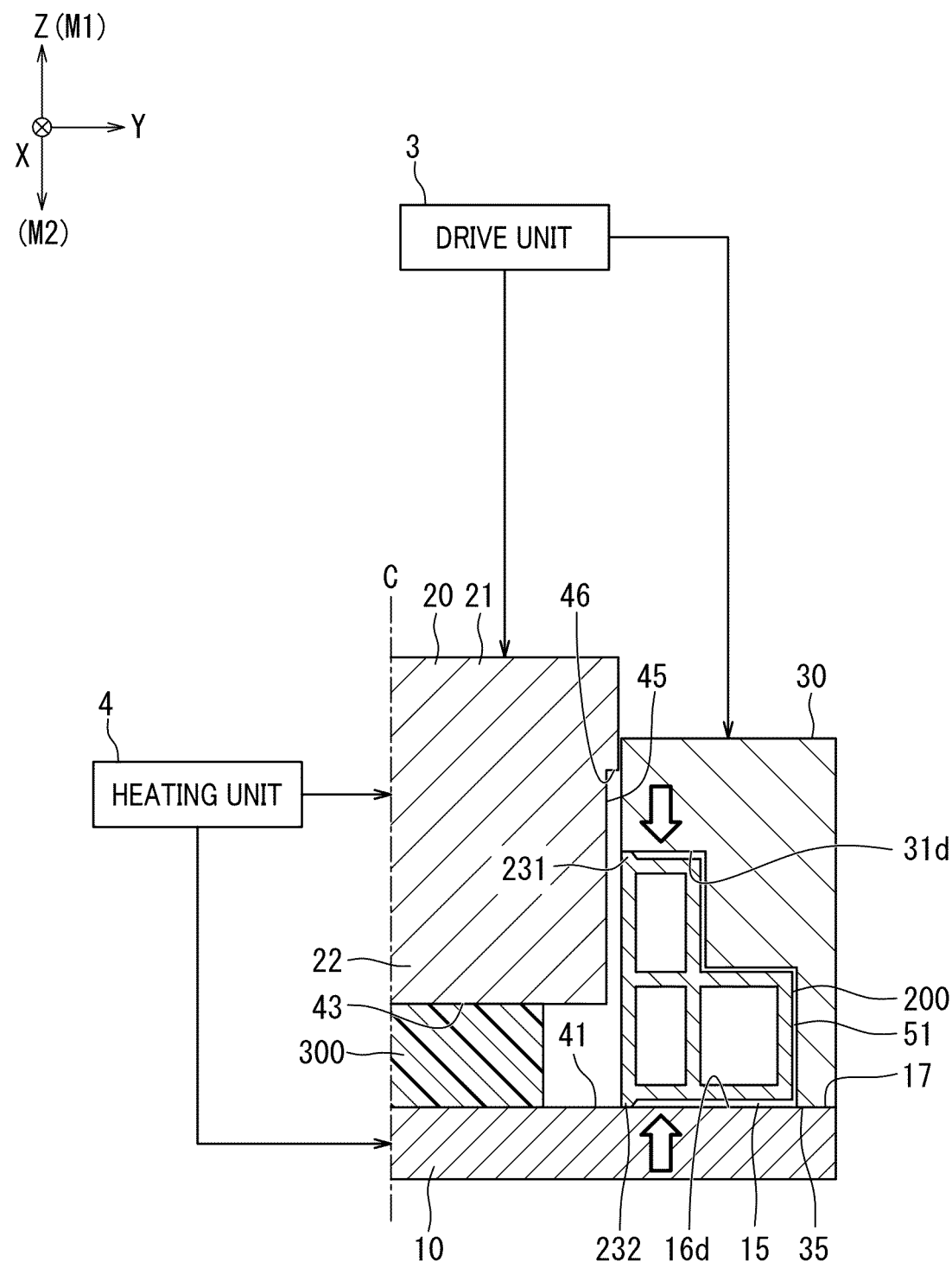
FIG. 19 is a conceptual diagram of the manufacturing method according to the fourth embodiment.
Figure 20:
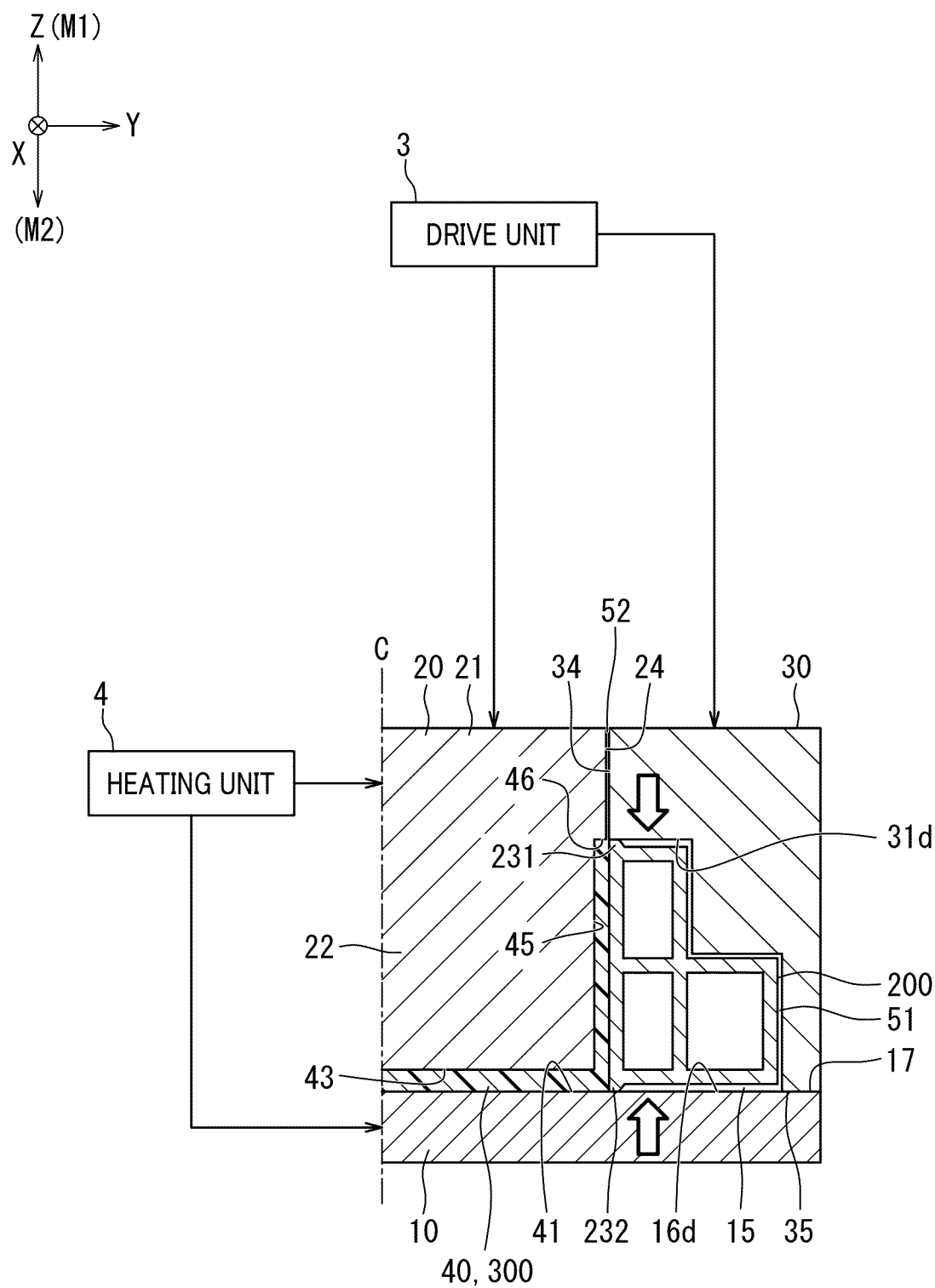
FIG. 20 is a conceptual diagram of the manufacturing method according to the fourth embodiment.

When the extruded material 200 is held by the first mold 10 and the third mold 30, the second mold 20 is moved downward to the bottom dead center as illustrated in FIGS. 19 and 20. The second mold 20 is guided by the third mold 30 and slides downward. The cavity 40 is defined by the lower molding surface 41, the first upper molding surface 43, an inner molding surface, a second upper molding surface, and an outer surface of the side wall 202 of the extruded material 200. Due to close contact of the protrusions 231 and 232, the cavity 40 is disconnected from the gap 51 between a surface of the extruded material 200 and an inner surface (the extruded material installation surface 16d, the first inner side surface 31a, the first inner bottom surface 31b, the second inner side surface 31c, and the second inner bottom surface 31d) of the housing portion 15.

Figure 21:
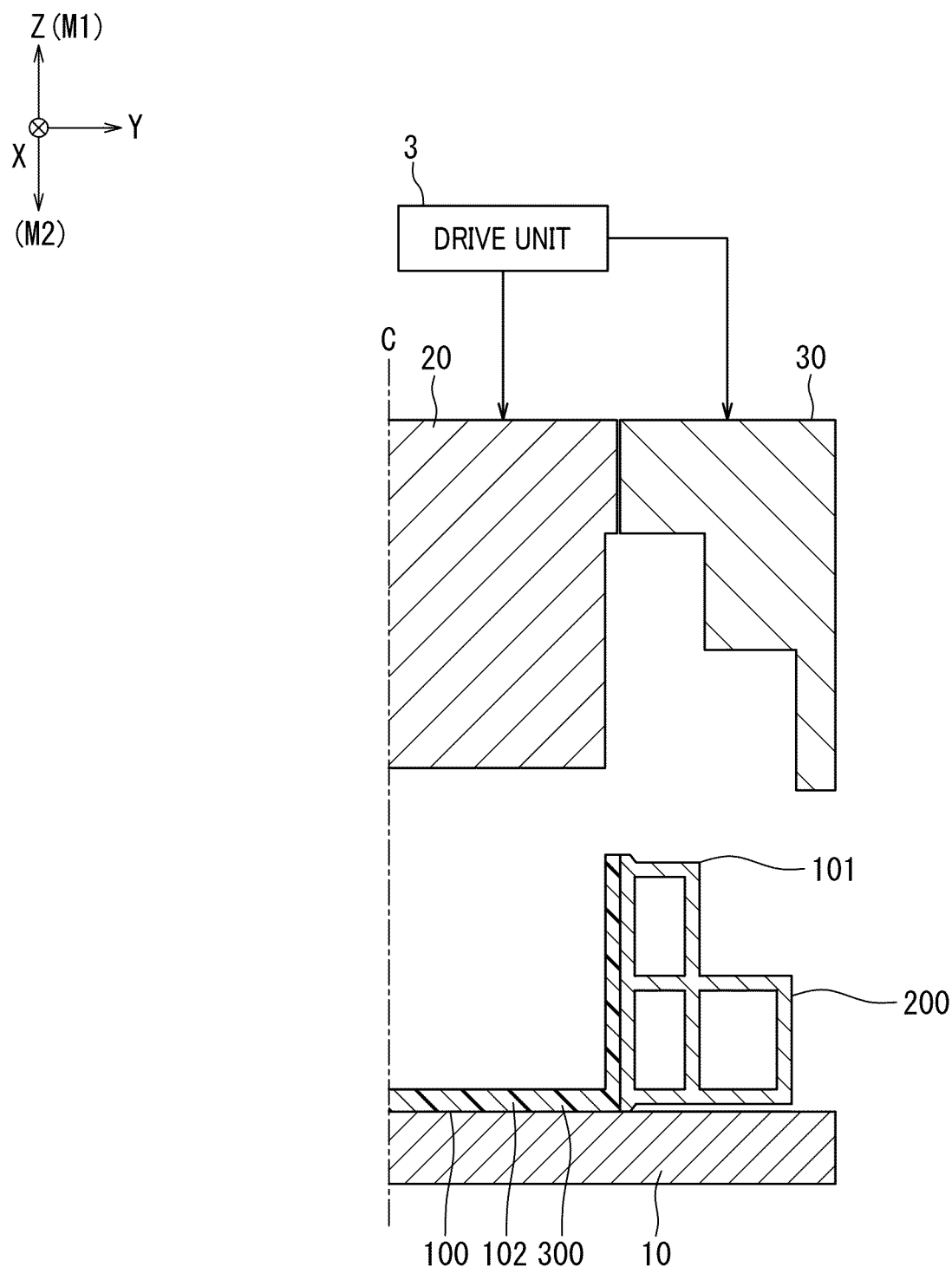
FIG. 21 is a conceptual diagram of the manufacturing method according to the fourth embodiment.

For this reason, also in the present embodiment, it is possible to prevent the resin material 300 from unintentionally flowing into the gap 51 when the cavity 40 is filled with the resin material 300. After molding, as illustrated in FIG. 21, the second mold 20 and the third mold 30 are retracted upward. Even if the extruded material 200 has an outer wall and thus has a complicated cross-sectional shape, the extruded material 200 can be easily released from a mold.

Fifth Embodiment

Next, a fifth embodiment will be described focusing on a difference from the above embodiment.

Referring to FIG. 21, the metal-resin composite 100 structurally has the frame portion 101 and the bottom plate portion 102 as in the fourth embodiment, and a framework of the frame portion 101 is configured as four of the extruded materials 200 are joined in a rectangular frame shape. The resin material 300 constitutes not only inner surfaces of the bottom plate portion 102 and the frame portion 101 but also an upper surface of the frame portion 101. Accordingly, shapes of the second mold 20, the third mold 30, and the cavity 40 are different from those of the fourth embodiment.

Figure 22:
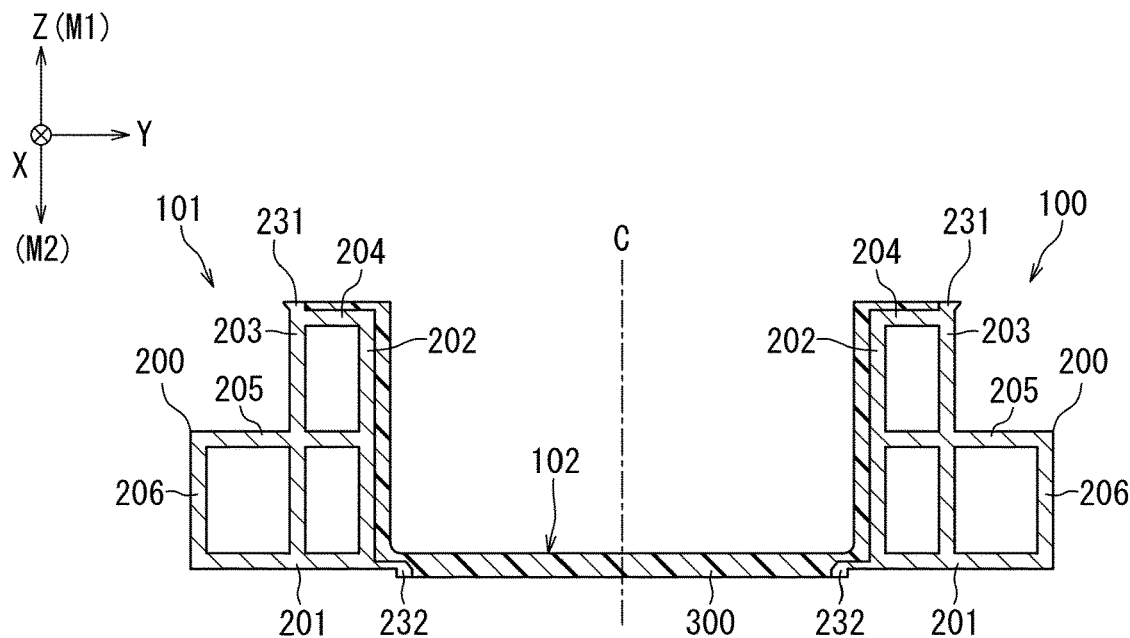
FIG. 22 is a view corresponding to FIG. 15B in a fifth embodiment.
Figure 23:
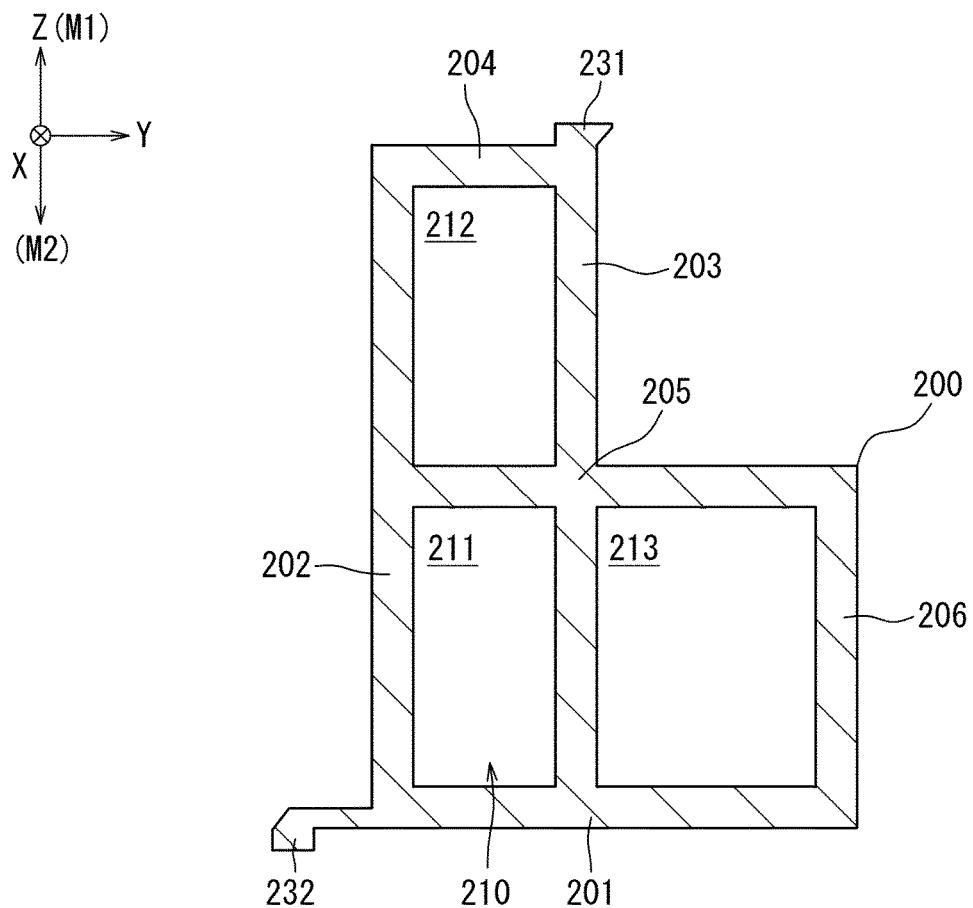
FIG. 23 is a view corresponding to FIG. 16 in the fifth embodiment.

Referring also to FIG. 22, the extruded material 200 is formed in an L shape similarly to the fourth embodiment and has the protrusions 231 and 232. The protrusion 231 protrudes upward from a corner between the top wall 204 and the side wall 203. The protrusion 232 protrudes inward in the width direction from a corner between the bottom wall 201 and the side wall 202. A lower surface of the protrusion 232 is positioned slightly lower than a lower surface of the bottom wall 201 (surface to be installed in the first mold 10).

Figure 24:
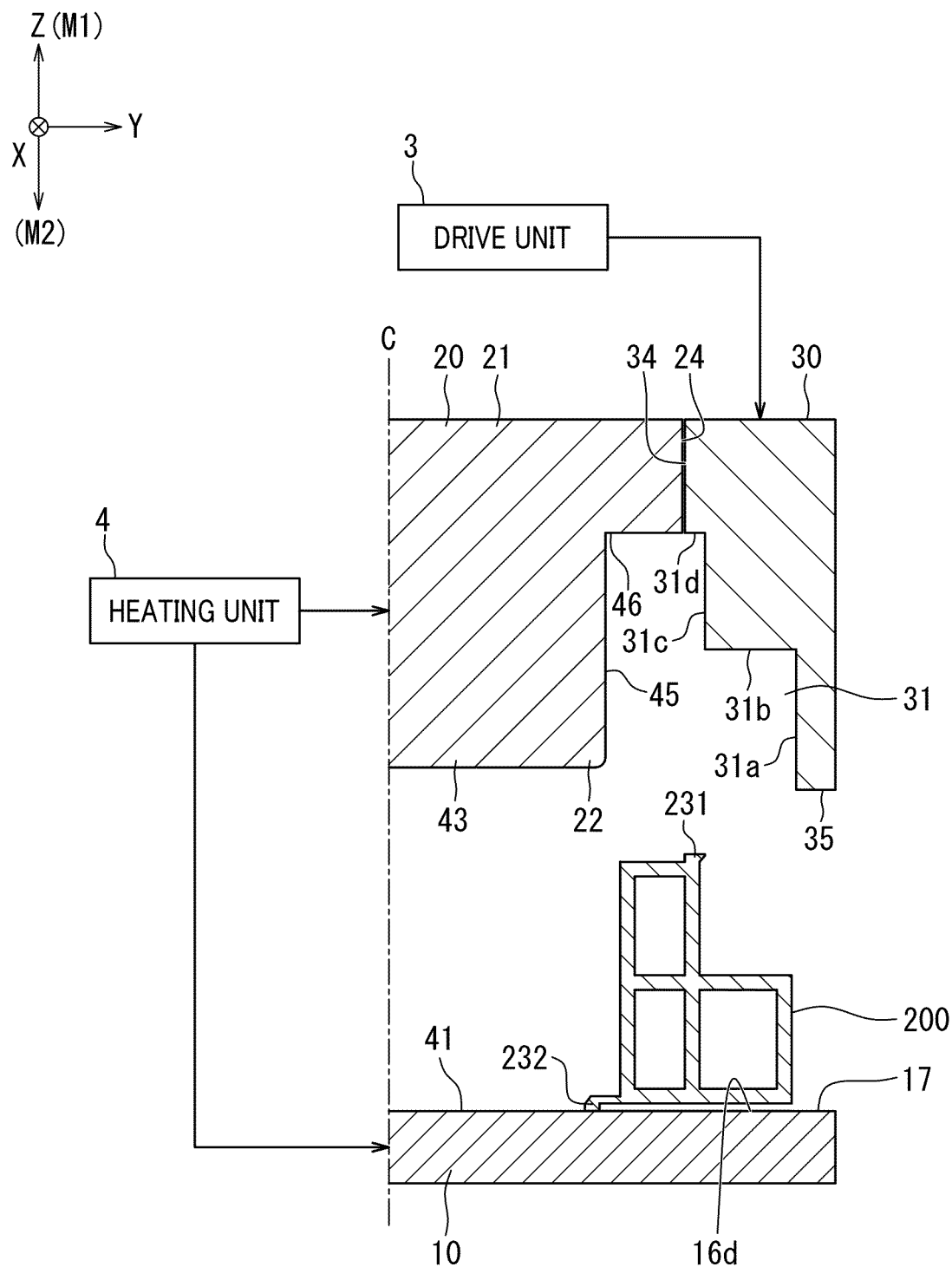
FIG. 24 is a view corresponding to FIG. 17 in the fifth embodiment.

Referring to FIG. 24, the second inner bottom surface 31d of the third mold 30 has a width equal to a width of the top wall 204 in the fourth embodiment, but has a width corresponding to a plate thickness of the side wall 203 in the present embodiment. The extruded material 200 is installed on the extruded material installation surface 16d of the first mold 10 in a state where the second mold 20 and the third mold 30 are retracted upward.

Figure 25:
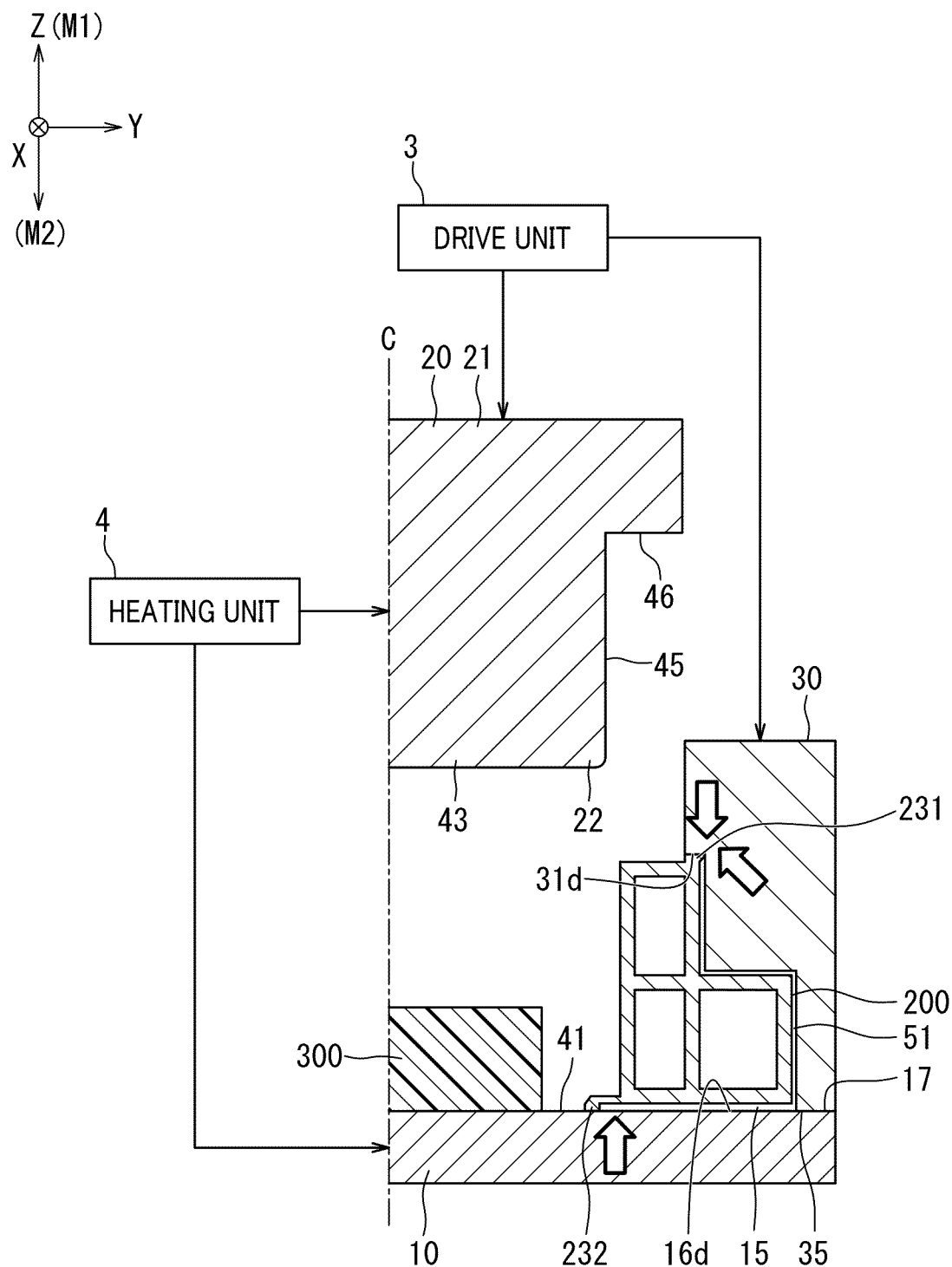
FIG. 25 is a view corresponding to FIG. 18 in the fifth embodiment.

Next, referring to FIG. 25, the third mold 30 is moved downward. By the above, the extruded material 200 is partially accommodated in the housing portion 15 surrounded by the extruded material installation surface 16d and the recessed portion 31. The top wall 204 and the side wall 202 are exposed from the housing portion 15. At this time, the protrusion 231 is brought into close contact with a second inner bottom surface by molding pressure of the third mold 30. The protrusion 232 is elastically deformed by the molding pressure and comes into close contact with the lower molding surface 41 or the extruded material installation surface 16d. Next, the compound of the resin material 300 is placed on the lower molding surface 41.

Figure 26:
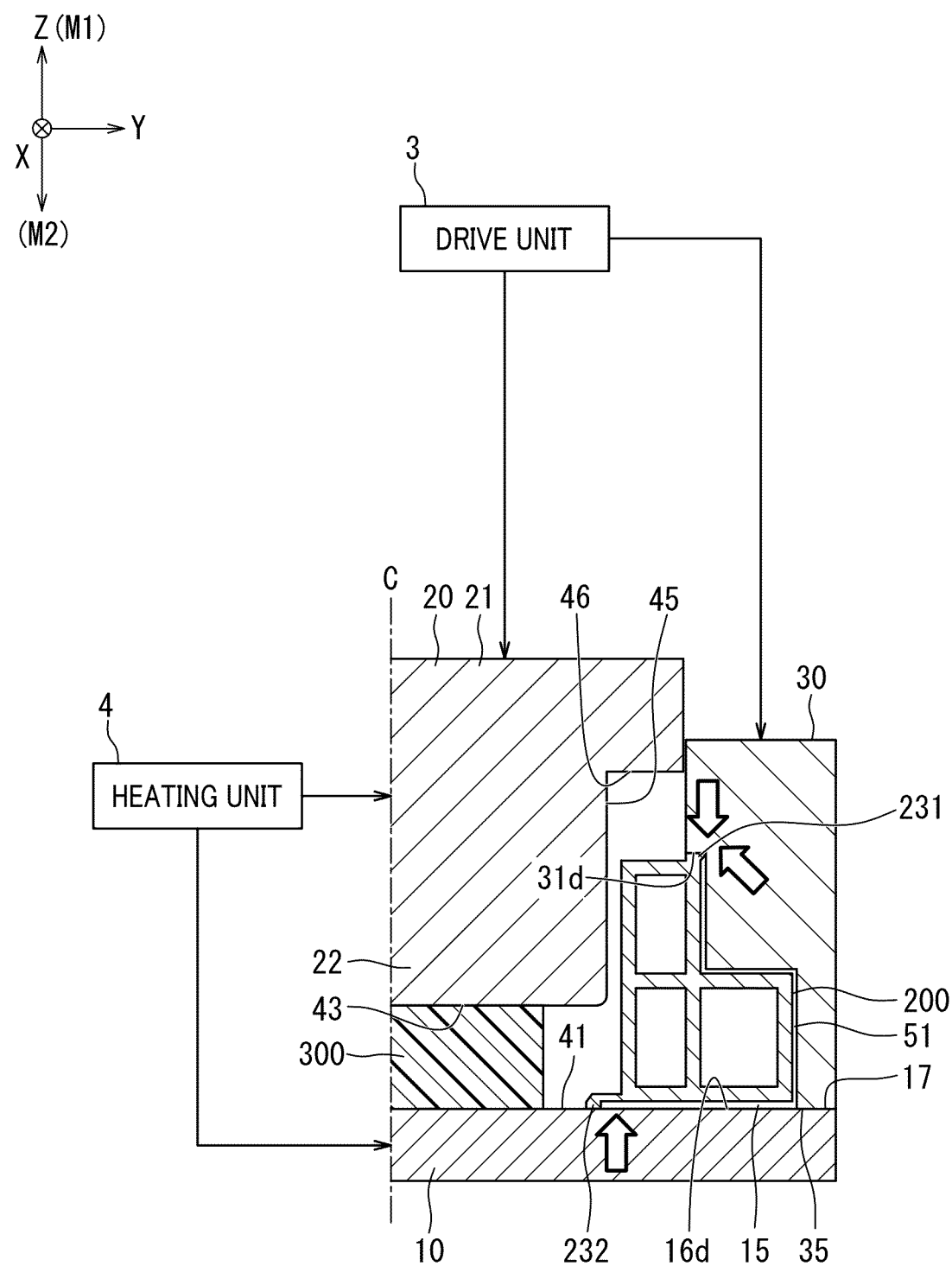
FIG. 26 is a view corresponding to FIG. 19 in the fifth embodiment.
Figure 27:
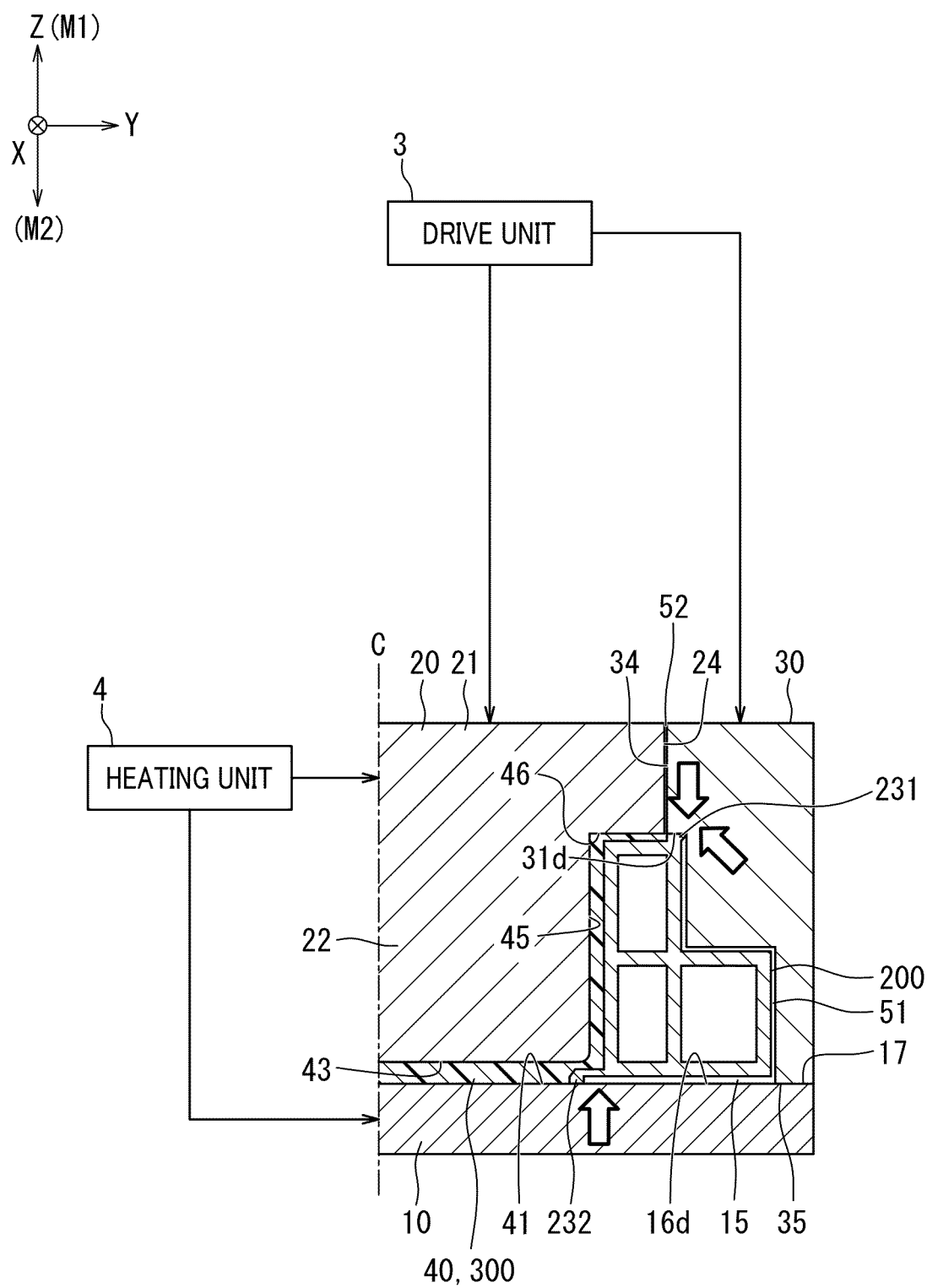
FIG. 27 is a view corresponding to FIG. 20 in the fifth embodiment.

After the above, as illustrated in FIGS. 26 and 27, the second mold 20 is moved to the bottom dead center. The cavity 40 is defined by the lower molding surface 41, the first upper molding surface 43, the inner molding surface 45, the second upper molding surface 46, an outer surface of the side wall 202 of the extruded material 200, and an outer surface of the top wall 204 of the extruded material 200. Due to close contact of the protrusions 231 and 232, the cavity 40 is disconnected from the gap 51 between a surface of the extruded material 200 and an inner surface (the extruded material installation surface 16d, the first inner side surface 31a, the first inner bottom surface 31b, and the second inner side surface 31c) of the housing portion 15.

Figure 28:
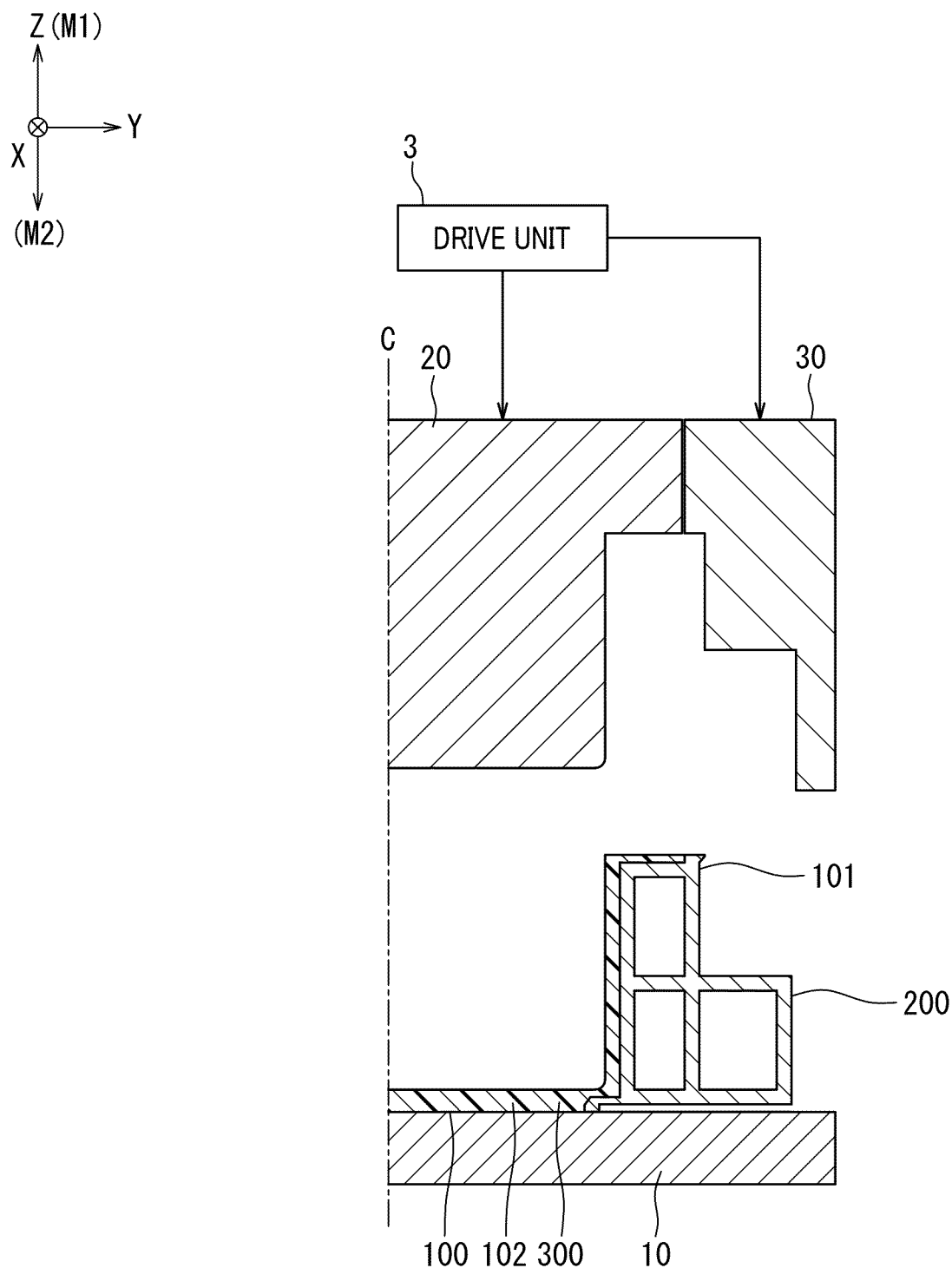
FIG. 28 is a view corresponding to FIG. 21 in the fifth embodiment.

For this reason, also in the present embodiment, it is possible to prevent the resin material 300 from unintentionally flowing into the gap 51 when the cavity 40 is filled with the resin material 300. Further, referring to FIG. 28, the metal-resin composite 100 can be easily released from a mold.

Sixth Embodiment

Next, a sixth embodiment will be described focusing on a difference from the above embodiment.

Figure 29:
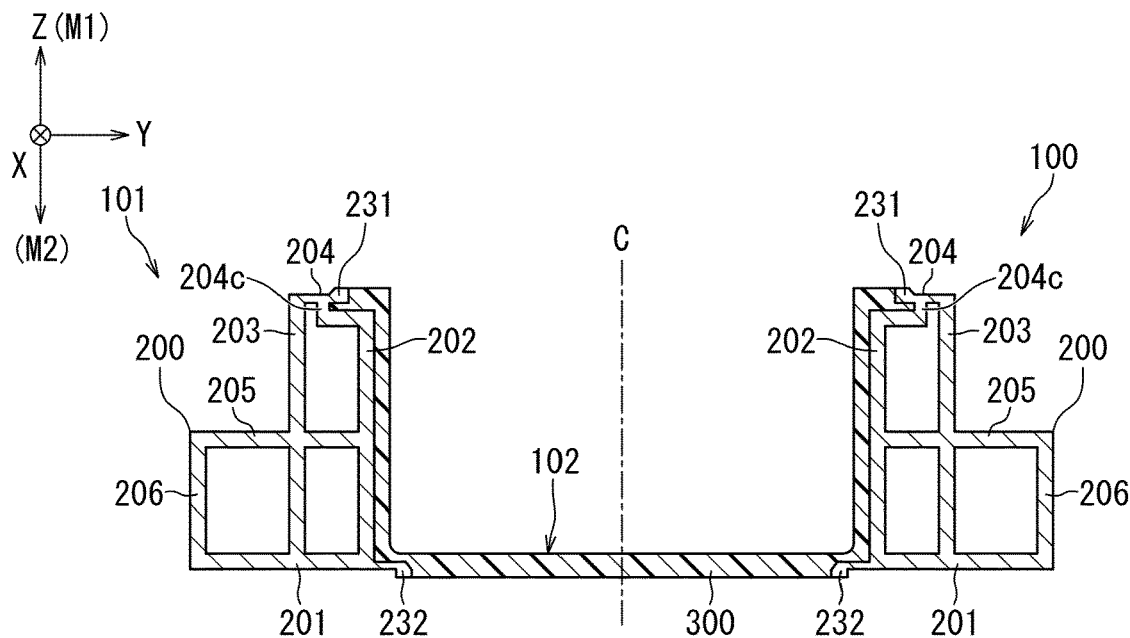
FIG. 29 is a view corresponding to FIG. 15B in the fifth embodiment.

Referring to FIG. 29, the metal-resin composite 100 structurally has the frame portion 101 and the bottom plate portion 102 as in the fourth and fifth embodiments, and a framework of the frame portion 101 is configured as four of the extruded materials 200 are joined in a rectangular frame shape. The resin material 300 constitutes the bottom plate portion 102 and an inner surface of the frame portion 101, and constitutes a part of an upper surface of the frame portion 101. Accordingly, shapes of the second mold 20, the third mold 30, and the cavity 40 are different from those of the fourth embodiment.

Figure 30:
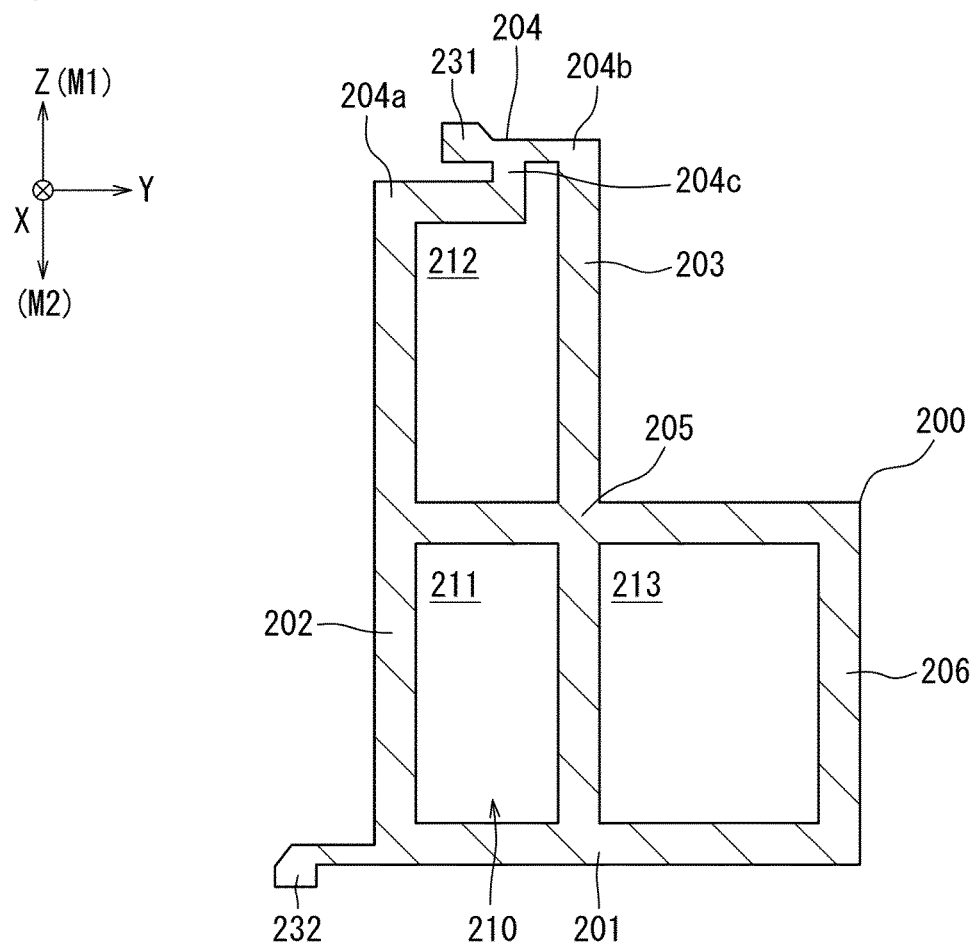
FIG. 30 is a view corresponding to FIG. 16 in the fifth embodiment.

Referring to FIG. 30, in the top wall 204 of the extruded material 200, the outer side in the width direction is higher than the inner side. The top wall 204 has a low portion 204a extending inward in the width direction Y from an upper end portion of the side wall 202 and a high portion 204b extending outward in the width direction Y from an upper end portion of the side wall 203, and the extruded material 200 has a step portion 204c connecting the low portion 204a and the high portion 204b in the height direction. The protrusion 232 is similar to that of the fifth embodiment. The protrusion 231 is provided in the step portion 204c and protrudes outward in the width direction Y from a corner between the high portion 204b and the step portion 204c. By the above, the protrusion 231 and the step portion 204c are formed in a hook shape.

Figure 31:
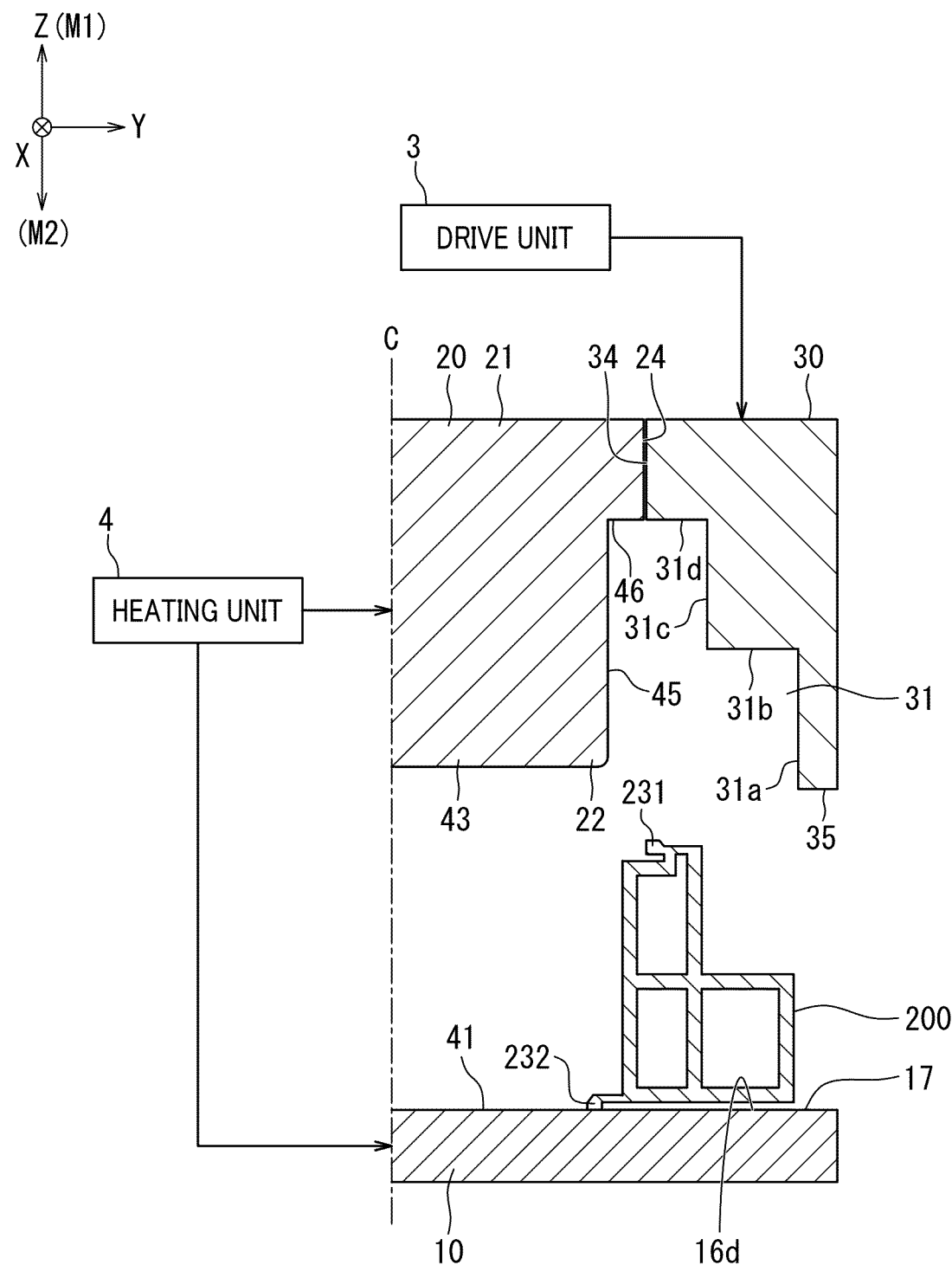
FIG. 31 is a view corresponding to FIG. 17 in the fifth embodiment.

Referring to FIG. 31, the second inner bottom surface 31d of the third mold 30 has a width equivalent to a width of the top wall 204 in the fourth embodiment, but has a width corresponding to the sum of widths of the high portion 204b and the protrusion 231 in the present embodiment. The extruded material 200 is installed on the extruded material installation surface 16d of the first mold 10 in a state where the second mold 20 and the third mold 30 are retracted upward.

Figure 32:
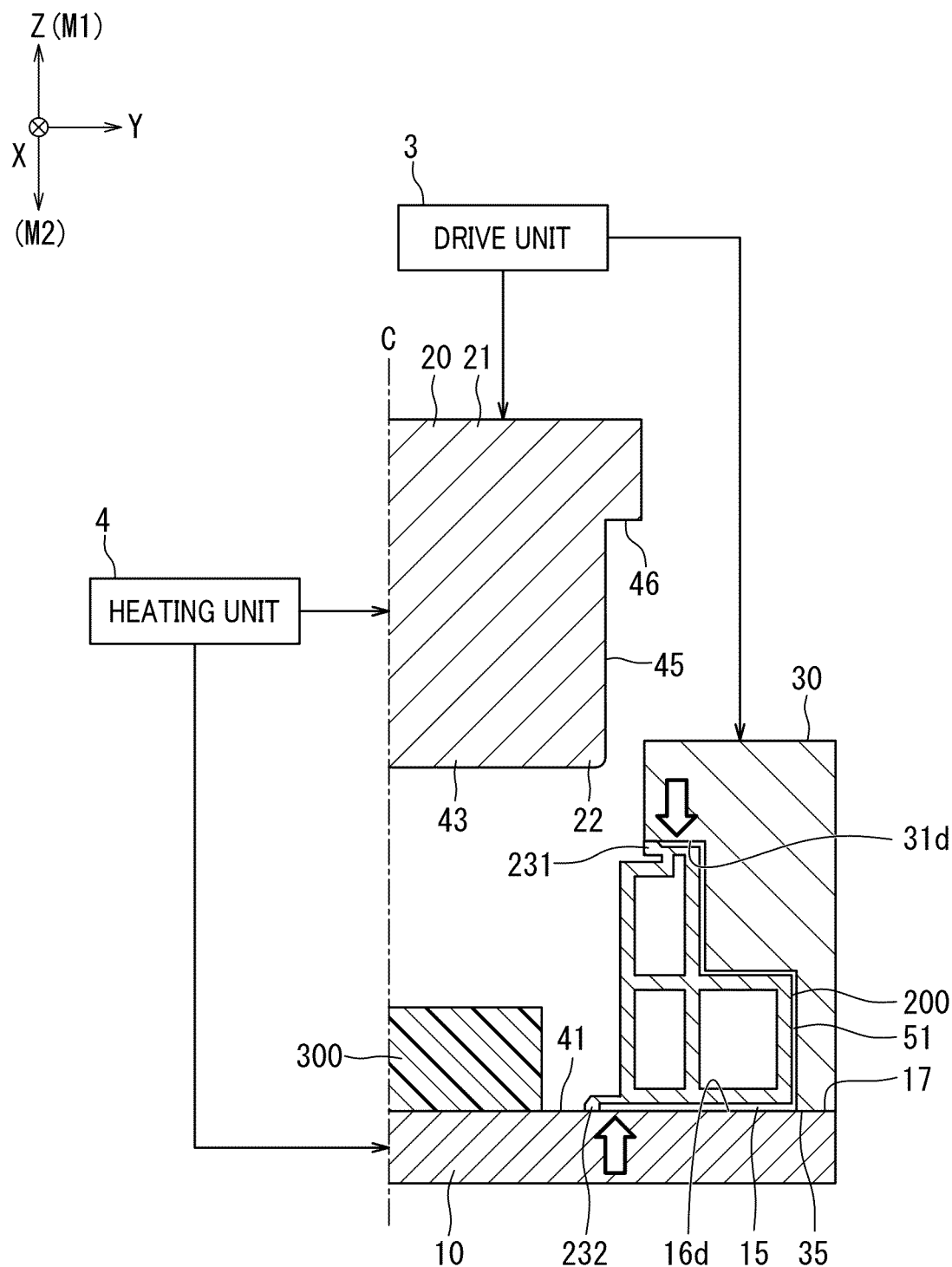
FIG. 32 is a view corresponding to FIG. 18 in the fifth embodiment.

Next, as illustrated in FIG. 32, the third mold 30 is moved downward. By the above, the extruded material 200 is partially accommodated in the housing portion 15 surrounded by the extruded material installation surface 16d and the recessed portion 31. The low portion 204a of the top wall 204 and the side wall 202 are in a state of exposed from the housing portion 15. At this time, the protrusion 231 is brought into close contact with a second inner bottom surface by molding pressure of the third mold 30. The protrusion 231, which is formed in a hook shape, is elastically deformed by the molding pressure and comes into close contact with the third mold 30 by its reaction force. The protrusion 232 is also in close contact with the lower molding surface 41 or the extruded material installation surface 16d in the same manner as in the fifth embodiment. Next, the compound of the resin material 300 is placed on the lower molding surface 41.

Figure 33:
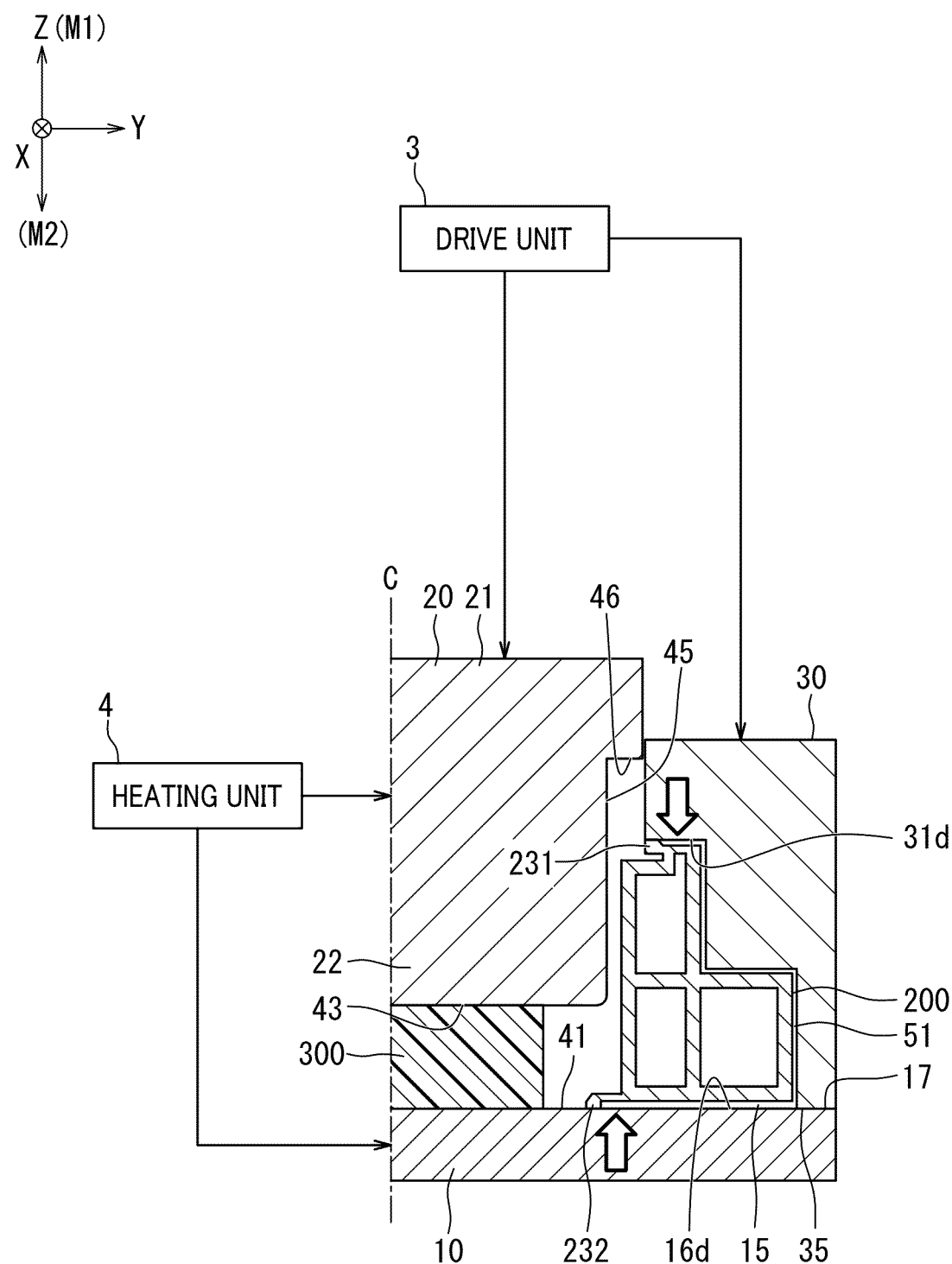
FIG. 33 is a view corresponding to FIG. 19 in the fifth embodiment.
Figure 34:
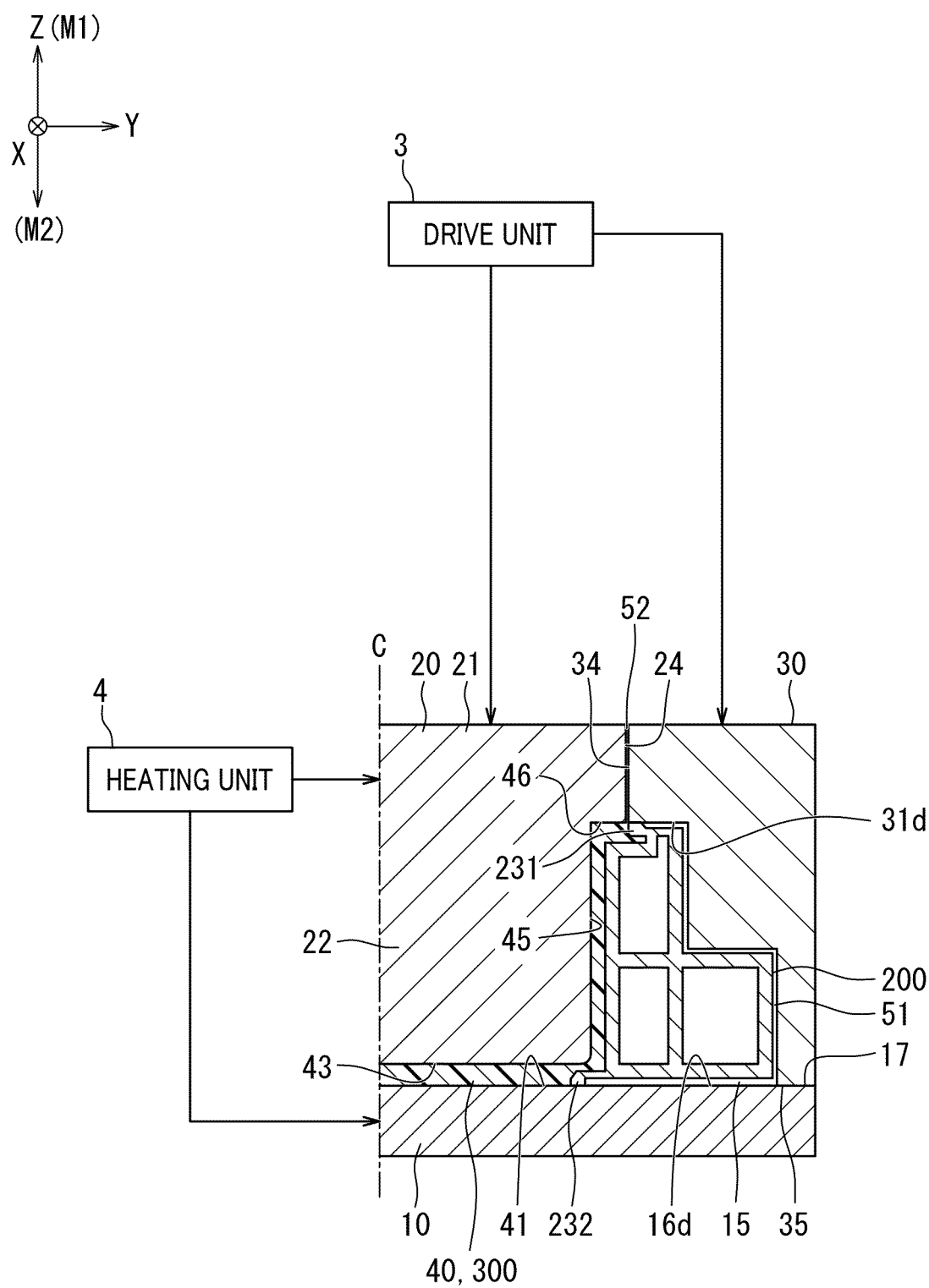
FIG. 34 is a view corresponding to FIG. 20 in the fifth embodiment.

After the above, as illustrated in FIGS. 33 and 34, the second mold 20 is moved to the bottom dead center. The cavity 40 is defined by the lower molding surface 41, the first upper molding surface 43, the inner molding surface 45, the second upper molding surface 46, an outer surface of the side wall 202 of the extruded material 200, and an outer surface of the low portion 204a of the top wall 204 of the extruded material 200. Due to close contact of the protrusions 231 and 232, the cavity 40 is disconnected from the gap 51 between a surface of the extruded material 200 and an inner surface (the extruded material installation surface 16d, the first inner side surface 31a, a first inner bottom surface, and a second inner side surface) of the housing portion 15.

Figure 35:
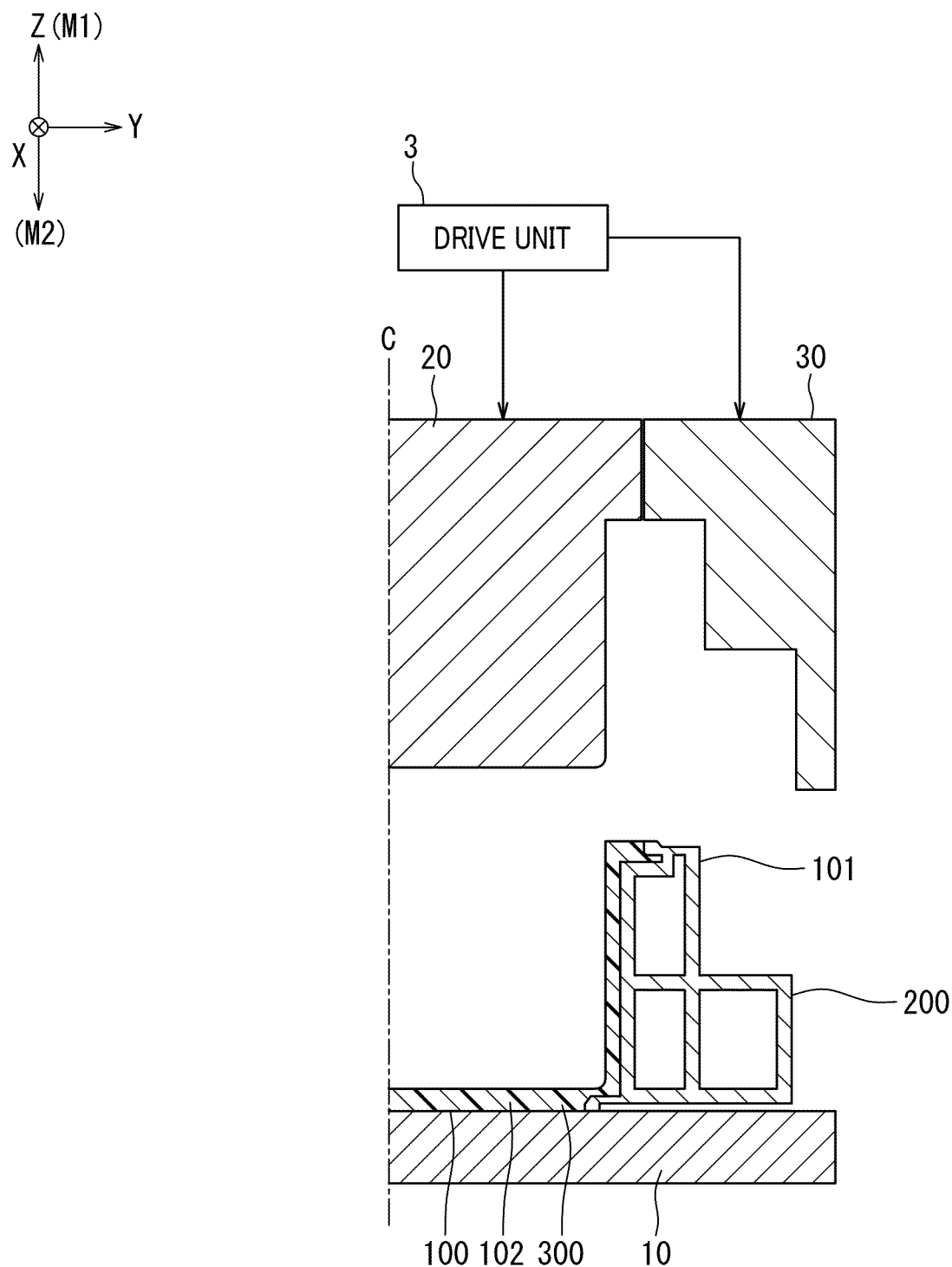
FIG. 35 is a view corresponding to FIG. 21 in the fifth embodiment.

For this reason, also in the present embodiment, it is possible to prevent the resin material 300 from unintentionally flowing into the gap 51 when the cavity 40 is filled with the resin material 300. Further, referring to FIG. 35, the metal-resin composite 100 can be easily released from a mold.

Although the embodiment of the present invention is described above, the above configuration can be appropriately changed, added, and deleted within the scope of the gist of the present invention.

The invention claimed is:

1. A method for manufacturing a metal-resin composite in which a resin material is integrated with an extruded material made from metal by press molding, the method comprising:
   preparing a mold including a first mold forming a housing portion that accommodates at least a part of the extruded material and a second mold movable, in an opening and closing direction, with respect to the first mold;
   accommodating the extruded material in the housing portion and disposing the resin material on the first mold; and
   moving the second mold in a mold closing direction to form a cavity defined by an exterior surface of the extruded material and the mold, and filling the cavity with the resin material by pressurizing the resin material, wherein
   the extruded material comprises a hollow including at least one chamber, and at least one protrusion protruding from the exterior surface and approaching the housing portion in an accommodation state where the extruded material is accommodated in the housing portion, and
   in the filling, the at least one protrusion is brought into close contact with the housing portion or a peripheral edge portion thereof by molding pressure applied from the mold to the extruded material, and the cavity is disconnected from a gap between an inner surface of the housing portion and the exterior surface of the extruded material.

2. The method for manufacturing a metal-resin composite according to claim 1, wherein
   in the filling, the molding pressure is applied to the extruded material via the resin material.

3. The method for manufacturing a metal-resin composite according to claim 1, wherein
   the mold further includes a third mold that is movable, in the opening and closing direction of the mold, with respect to the first mold and forms the housing portion together with the first mold, and
   the at least one protrusion includes a first protrusion that protrudes in the opening and closing direction in the accommodation state, and the third mold comes into contact with the first protrusion so that the molding pressure is applied to the extruded material from the third mold.

4. The method for manufacturing a metal-resin composite according to claim 3, wherein
   the at least one protrusion further includes a second protrusion, and the first protrusion and the second protrusion are provided on opposite sides in the opening and closing direction of the extruded material, the second protrusion disconnects a portion formed by the extruded material and the first mold of the gap from the cavity, and the first protrusion disconnects a portion formed by the extruded material and the third mold of the gap from the cavity.

5. The method for manufacturing a metal-resin composite according to claim 4, wherein
   the second protrusion protrudes in a direction approaching the first mold with respect to a surface installed on the first mold of the extruded material.

6. The method for manufacturing a metal-resin composite according to claim 5, wherein
the first protrusion is provided in a step portion of the extruded material and has a hook shape, and the third mold comes into contact with the first protrusion so that the molding pressure is applied from the third mold to the first protrusion.

7. The method for manufacturing a metal-resin composite according to claim 4, wherein
the first protrusion is provided in a step portion of the extruded material and has a hook shape, and the third mold comes into contact with the first protrusion so that the molding pressure is applied from the third mold to the first protrusion.

8. A method for manufacturing a metal-resin composite in which a resin material is integrated with an extruded material made from metal by press molding, the method comprising:
preparing a mold including a first mold forming a housing portion that accommodates at least a part of the extruded material and a second mold movable, in an opening and closing direction, with respect to the first mold;
accommodating the extruded material in the housing portion and disposing the resin material on the first mold; and
moving the second mold in a mold closing direction to form a cavity defined by an exterior surface of the extruded material and the mold, and filling the cavity with the resin material by pressurizing the resin material, wherein
the extruded material comprises at least one protrusion protruding from the exterior surface and approaching the housing portion in an accommodation state where the extruded material is accommodated in the housing portion,
in the filling, the at least one protrusion is brought into close contact with the housing portion or a peripheral edge portion thereof by molding pressure applied from the mold to the extruded material, and the cavity is disconnected from a gap between an inner surface of the housing portion and the exterior surface of the extruded material,
in the filling, the molding pressure is applied to the extruded material via the resin material,
the extruded material includes a first flange and a second flange extending along the inner surface of the housing portion in the accommodation state,
the at least one protrusion includes a first protrusion provided on the first flange and a second protrusion provided on the second flange,
the first flange and the second flange form an inner space between inner surfaces thereof, and the inner space constitutes a part of the cavity, and
in the filling, the molding pressure is applied to the first flange and the second flange via the resin material that has flowed into the inner space, the first flange and the second flange are deformed toward the inner surface of the housing portion, and the first protrusion and the second protrusion are brought into close contact with the housing portion or the peripheral edge portion thereof.

9. The method for manufacturing a metal-resin composite according to claim 8, wherein
the first protrusion is provided on an outer surface of the first flange and the second protrusion is provided on an outer surface of the second flange, and
in the filling with the resin material, the first protrusion and the second protrusion come into close contact with the inner surface of the housing portion.

10. The method for manufacturing a metal-resin composite according to claim 4, wherein
the extruded material has a first outer inclined surface provided on a lower surface side of the first protrusion and a second outer inclined surface on a lower surface of the second protrusion, the first outer inclined surface and the second outer inclined surface are inclined so as to be separated from the housing portion in an accommodating direction of the extruded material into the housing portion in the accommodation state, and
in the accommodating the extruded material, the first flange and the second flange are deformed to an inner space side due to interference of the first outer inclined surface and the second outer inclined surface with the housing portion, and the first protrusion and the second protrusion come into close contact with the inner surface of the housing portion by an elastic force of the first flange and the second flange.

11. The method for manufacturing a metal-resin composite according to claim 9, wherein
the extruded material has an inner inclined surface provided on at least one of a tip portion of the first flange or a tip portion of the second flange, and
the inner inclined surface is inclined so as to be separated from the housing portion toward a base end side of the first flange or the second flange in the accommodation state.

12. The method for manufacturing a metal-resin composite according to claim 11, wherein
the extruded material has a protruding portion that is provided on the at least one of the tip portion of the first flange or the tip portion of the second flange and protrudes to an inner space side farther than the inner surfaces of the first flange and the second flange, and
the inner inclined surface is formed on the protruding portion.

13. The method for manufacturing a metal-resin composite according to claim 12, wherein
the extruded material has a first outer inclined surface provided on a lower surface side of the first protrusion and a second outer inclined surface on a lower surface of the second protrusion, the first outer inclined surface and the second outer inclined surface are inclined so as to be separated from the housing portion in an accommodating direction of the extruded material into the housing portion in the accommodation state, and
in the accommodating the extruded material, the first flange and the second flange are deformed to an inner space side due to interference of the first outer inclined surface and the second outer inclined surface with the housing portion, and the first protrusion and the second protrusion come into close contact with the inner surface of the housing portion by an elastic force of the first flange and the second flange.

14. The method for manufacturing a metal-resin composite according to claim 11, wherein
the extruded material has a first outer inclined surface provided on a lower surface side of the first protrusion and a second outer inclined surface on a lower surface of the second protrusion, the first outer inclined surface and the second outer inclined surface are inclined so as to be separated from the housing portion in an accommodating direction of the extruded material into the housing portion in the accommodation state, and in the accommodating the extruded material, the first flange and the second flange are deformed to an inner space side due to interference of the first outer inclined surface and the second outer inclined surface with the housing portion, and the first protrusion and the second protrusion come into close contact with the inner surface of the housing portion by an elastic force of the first flange and the second flange.

15. The method for manufacturing a metal-resin composite according to claim 8, wherein the extruded material has a protruding piece protruding from at least one of tip portions of the first flange or the second flange to outside of the first flange or the second flange and exposed from the housing portion in the accommodation state, the first protrusion or the second protrusion is provided at a tip portion of the protruding piece, and in the filling with the resin material, the first protrusion and the second protrusion are brought into close contact with the peripheral edge portion of the housing portion.

16. The method for manufacturing a metal-resin composite according to claim 15, wherein the protruding piece has a pressure receiving surface perpendicular to the opening and closing direction of the mold in the accommodation state, and the at least one protrusion is provided at the tip portion of the protruding piece and faces the peripheral edge portion in the opening and closing direction.

* * * * *